(12) United States Patent
Iizuka et al.

(10) Patent No.: US 7,518,659 B2
(45) Date of Patent: Apr. 14, 2009

(54) VIDEO MIXER APPARATUS

(75) Inventors: Akira Iizuka, Hamamatsu (JP); Hiroyuki Iwase, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 565 days.

(21) Appl. No.: 11/248,837

(22) Filed: Oct. 11, 2005

(65) Prior Publication Data

US 2006/0028584 A1 Feb. 9, 2006

Related U.S. Application Data

(62) Division of application No. 10/084,208, filed on Feb. 25, 2002, now Pat. No. 7,019,788.

(30) Foreign Application Priority Data

Feb. 28, 2001 (JP) ............................. 2001-054296

(51) Int. Cl.
H04N 9/74 (2006.01)
(52) U.S. Cl. ...................................... 348/584
(58) Field of Classification Search ................ 348/584, 348/587, 588, 598, 705, 706, 553, 554
See application file for complete search history.

(56) References Cited

U.S. PATENT DOCUMENTS

| | | | |
|---|---|---|---|
| 6,147,717 A | 11/2000 | Jun | |
| 6,333,750 B1 | 12/2001 | Odryna et al. | |
| 6,348,953 B1 | 2/2002 | Rybczynski | |
| 6,384,868 B1 * | 5/2002 | Oguma | ....................... 348/564 |
| 6,393,162 B1 | 5/2002 | Higurashi | |

(Continued)

FOREIGN PATENT DOCUMENTS

GB 2263049 A 7/1993

(Continued)

OTHER PUBLICATIONS

Curtis Roads, "Computer Music-History/Technology/Art—vol. 1", The Computer Music Tutorial, Japan, Tokyo Denki University Publishing Office, Jan. 20, 2001, vol. 1, pp. 292-297.

(Continued)

*Primary Examiner*—Paulos M Natnael
(74) *Attorney, Agent, or Firm*—Morrison & Foerster LLP

(57) ABSTRACT

Video picture signals are received via at least three channels. At least three control instructing operators are provided in correspondence with the channels. Each control instructing operator is operable to give a signal control instruction for the corresponding channel in accordance with an operated amount of the operator. Controller performs signal control on the video picture signals of the channels on the basis of the respective signal control instructions given via the control instructing operators. Synthesizer synthesizes the video picture signals of the channels having been subjected to the signal control by the controller. Video picture signals of two desired channels are designated, and a contact-type operator gives signal control instructions, corresponding to a predetermined position of the operator contacted by a human operator, with respect to the video picture signals of the designated two channels. By the signal control instructions, signal control is performed on the video picture signals of the designated two channels to thereby synthesize the video picture signals.

16 Claims, 7 Drawing Sheets

U.S. PATENT DOCUMENTS

| | | |
|---|---|---|
| 6,437,834 B1 | 8/2002 | Tagami |
| 6,462,786 B1 | 10/2002 | Glen et al. |
| 6,515,707 B1 | 2/2003 | Lee |
| 6,593,973 B1 | 7/2003 | Sullivan et al. |
| 6,678,005 B2 | 1/2004 | Anderson et al. |
| 7,019,788 B2 * | 3/2006 | Iizuka et al. ................ 348/584 |
| 7,236,210 B2 * | 6/2007 | Iwase ........................ 348/584 |

FOREIGN PATENT DOCUMENTS

| | | |
|---|---|---|
| JP | 4-347917 | 12/1992 |
| JP | 5-176399 | 7/1993 |
| JP | 6-141235 | 5/1994 |
| JP | 6-311428 | 11/1994 |
| JP | 7-170447 | 7/1995 |
| JP | 7-265578 | 10/1995 |
| JP | 8-016159 | 1/1996 |
| JP | 2000-184315 | 6/2000 |
| JP | 2000-232609 | 8/2000 |
| JP | 2000-305543 | 11/2000 |
| WO | WO-95/27368 | 10/1995 |

OTHER PUBLICATIONS

Haruo Tsuda et al., "Digital Control Console ADX-7000 for Broadcast", Digital Control Audio Console ADX-7000 for Broadcast, ITEI Technical Report, Japan, Television Institute, Jun. 25, 1993, vol. 17, No. 37, pp. 35-40.

* cited by examiner

VIDEO MIXER APPARATUS

BACKGROUND OF THE INVENTION

The present invention relates generally to video mixer apparatus capable of mixing a plurality of video pictures to create a special video picture, and more particularly to an improved video mixer apparatus that mixes video pictures, as appropriate, input via three or more input channels to create a special video picture.

Today, in many music concerts, discotheque clubs and the like, video pictures, not only still pictures and animated pictures, edited by a VJ (acronym for a Visual Jockey) or other picture artist having a good artistic sense are visually displayed to music pieces played by a band or DJ (Disk Jockey), so as to impart comprehensive effects to an entire place in question in accordance with musical scenes. It has been known to use a video mixer apparatus (also known as a video switcher apparatus) in such video picture editing by a VJ or the like. Typical example of the conventional video switcher apparatus is arranged to synthesize a plurality of video picture signals input from a plurality of video tape recorders and/or cameras to thereby create a special video picture. In addition to thus creating a special video picture by synthesizing a plurality of video picture signals, the conventional video switcher can create a video picture imparted with a predetermined effect, such as an overlap, wipe or keying. However, the conventional video mixer apparatus can only additively synthesize video picture signals receive from two input channels. Namely, although the conventional video mixer apparatus can receive video picture signals via a plurality of (e.g., four) input channels, it selects, as appropriate, the video picture signals received via just two of the input channels and then additively synthesizes the video picture signals of the thus-selected two input channels.

Because the conventional video mixer apparatus is designed to additively synthesize video picture signals received via only two selected input channels as noted above, the single video mixer apparatus can not, by itself, mix input video picture signals of three or more input channels to create a special video picture. Thus, for mixing video picture signals received via three or more input channels, it has heretofore been necessary to connect a plurality of such video mixer apparatus, which would, however, disadvantageously result in an increased overall size or reduced compactness of the apparatus. Further, when video picture signals received via three or more channels are to be simultaneously mixed together to create a special video picture, it has been conventional to perform the signal mixing step by step by appropriately manipulating the plurality of video mixer apparatus. However, performing the mixing by quickly and appropriately combining video picture signals of desired channels, selected from among the three or more channels, would require a great amount of time and labor and encounter extremely great difficulty.

Further, in the case where video picture signals received via two input channels are to be additively synthesized via the conventional video mixer apparatus, the user can vary a synthesis ratio between the video picture signals of the channels using a so-called T-Bar (Take-Bar). But, for variation in the synthesis ratio between the video picture signals received via the two input channels using the T-Bar like this, it has been only possible to set the synthesis ratio such that respective proportions of the video picture signals received via the two input channels always sum to 100%, e.g. with the video picture signal of the first input channel being set to 32% of a maximum amount for the first input channel and the video picture signal of the second input channel being set to 68% of a maximum amount for the second input channel. Namely, the use of the T-Bar alone can not set a desired synthesis ratio between the video picture signals received via the two input channels (e.g., 100% of the first-channel maximum amount to the video picture signal of the first input channel and 15% of the second-channel maximum amount to the video picture signal of the second input channel, or 30% of the first-channel maximum amount to the video picture signal of the first input channel and 20% of the second input channel to the video picture signal of the second input channel). Thus, when the video picture signals received via the two input channels are to be mixed at a desired synthesis ratio, extremely complicated manipulations must be performed, which tend to cause great inconveniences in quick video picture editing.

SUMMARY OF THE INVENTION

In view of the foregoing, it is an object of the present invention to provide a standalone video mixer apparatus which can, by itself, mix input video picture signals of three or more input channels in any desired combination.

It is another object of the present invention to provide a standalone video mixer apparatus which can mix input video picture signals of three or more input channels at any desired synthesis ratio.

According to one aspect of the present invention, there is provided a video mixer apparatus which comprises: a video-picture-signal input section that receives video picture signals via at least three or more channels; at least three or more control instructing operators provided in corresponding relation to the at least three or more channels, each of the control instructing operators being operable to give a signal control instruction for the corresponding channel in accordance with an operated amount of the operator; a control section that performs signal control on the video picture signals of the individual channels on the basis of respective ones of the signal control instructions given by the control instructing operators; and a video-picture-signal synthesis section that synthesizes the video picture signals of the individual channels having been subjected to the signal control by the control section.

Namely, the video mixer apparatus of the present invention is arranged such that video picture signals of at least three or more channels are input to the apparatus and then signal control is performed on the input video picture signal individually for each of the channels in accordance with an operated amount of the control instructing operator corresponding to the channel so that the video picture signals of the individual channels having been thus controlled are synthesized. Thus, the single video mixer apparatus of the invention can, by itself, synthesize video signals of three or more channels. Further, because the control instructing operators can give signal control instructions on the channel-by-channel basis, the present invention can perform video signal mixing by combining, as appropriate, the video picture signals of any desired ones of the channels.

According to another aspect of the invention, there is provided a video mixer apparatus which comprises: a video-picture-signal input section that receives video picture signals via at least three or more channels; a video-picture-signal synthesis section that synthesizes the video picture signals of the individual the channels received by the video-picture-signal input section; a designation section that designates the video picture signals of two desired channels from among the video picture signals to be synthesized by the video-picture-signal synthesis section; a contact-type operator that, by being contacted at a predetermined position thereof, gives a signal control instruction, corresponding to the contacted predetermined position, with respect to the designated video picture signals of the two desired channels; and a control section that, on the basis of the signal control instruction given by the contact-type operator, performs signal control on the designated video picture signals of the two desired channels to be synthesized by the video-picture-signal synthesis section. With such arrangements, settings can be made to permit mixing at a desired synthesis ratio between video picture signals of two channels selected from among the at least three or more channels.

According to still another aspect of the present invention, there is provided a video mixer apparatus which comprises: a video-picture-signal input section that receives video picture signals via at least three or more channels; a video-picture-signal synthesis section that synthesizes the video picture signals of the individual channels received by the video-picture-signal input section; at least three or more control instructing operators provided in corresponding relation to the channels, each of the control instructing operators being operable to give a signal control instruction about at least one of a displayed position and displayed size of the video picture signal of the corresponding channel; and a control section that performs signal control on each of the video picture signals of the channels to be synthesized by the video-picture-signal synthesis section, in accordance with the signal control instruction given by the control instructing operator corresponding to the channel of the video picture signal.

According to still another aspect of the present invention, there is provided a video mixer apparatus which comprises: a video-picture-signal input section that receives video picture signals via at least three or more channels; a video-picture-signal synthesis section that synthesizes the video picture signals of the individual channels received by the video-picture-signal input section; a display section that visually displays a video picture; a function-shift instructing section that instructs a shift between a plurality of display functions including at least a solo function, cue function and preview function. The solo function is a function for selecting a particular channel from among the at least three or more channels and displaying only a video picture signal of the particular channel, the cue function is a function for selecting a particular channel from among the at least three or more channels and displaying a video picture signal of the particular channel in a different style from video picture signals of the other channels, and the preview function is a function for previewing a video picture signal of a desired one of the channels. The video mixer apparatus also includes a control section that controls a video picture signal to be displayed by the display section, and the control section controls the display section to switch the video picture to be displayed, in accordance with a function shift instruction given by the function-shift instructing section.

According to still another aspect of the present invention, there is provided a video mixer apparatus which comprises: a video-picture-signal input section that receives video picture signals via a plurality of channels, each of the video signals containing a plurality of predetermined components; a video-picture-signal synthesis section that synthesizes the video picture signals of the individual channels received via the video-picture-signal input section; an operator; and an operation section capable of performing an arithmetic or logical operation on the basis of operation of the operator and using a portion or all of the plurality of predetermined components contained in the video picture signals of the individual channels. Here, the video-picture-signal synthesis section can synthesize the video picture signals of the individual channels using a result of the arithmetic or logical operation performed by the operation section.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the objects and other features of the present invention, its embodiments will be described in greater detail hereinbelow with reference to the accompanying drawings, in which.

DETAILED DESCRIPTION OF EMBODIMENTS

Figure 1:
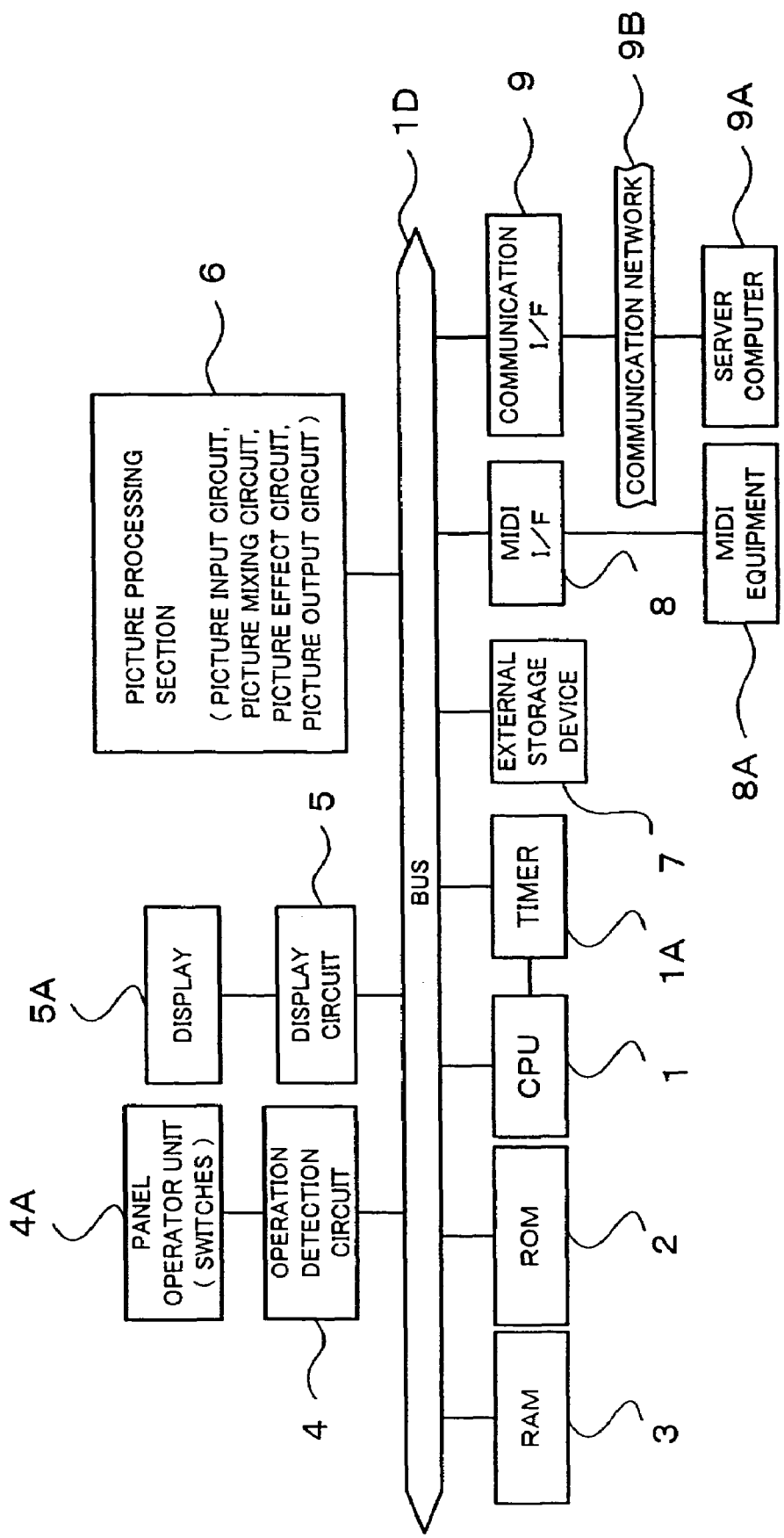
FIG. 1 is a block diagram showing an exemplary general hardware setup of a video mixer apparatus in accordance with an embodiment of the present invention.

FIG. 1 is a block diagram showing an exemplary general hardware setup of a video mixer apparatus VM in accordance with an embodiment of the present invention.

In this embodiment, various operations are carried out under control of a microcomputer comprising a microprocessor unit (CPU) 1, a read-only memory (ROM) 2 and a random access memory (RAM) 3. The embodiment will be described in relation to such a video mixer apparatus VM that carries out various operations, such as video picture synthesis and effect impartment, in accordance with instructions given by the single CPU 1; that is, the CPU 1 controls behavior of the entire video mixer apparatus VM. To the CPU 1 are connected, via a communication bus (such as a data and address bus) 1D, the read-only memory (ROM) 2, random access memory (RAM) 3, operation detection circuit 4, display circuit 5, picture processing section 6, external storage device 7, MIDI interface (I/F) 8 and communication interface (I/F) 9. Also connected to the CPU 1 is a timer 1A for counting various time periods and intervals and generating tempo clock pulses to be used for outputting video picture signals, received asynchronously via a plurality of video input channels, at same timing (i.e., in a synchronized fashion). Such tempo clock pulses generated by the timer 1A are also given to the CPU 1 as processing timing instructions or as interrupt instructions. In accordance with such instructions from the timer 1A, the CPU 1 controls various components of the mixer apparatus VM to carry out various processes, such as a process for mixing video picture signals received via a plurality of video input channels and outputting a mixed video picture and a process for imparting any of various effects to a video picture.

The ROM 2 has prestored therein various programs to be executed by the CPU 1 and various data to be referred to by the CPU 1. The RAM 3 is used as a working memory for temporarily storing various data generated as the CPU 1 executes a predetermined program, or as a memory for storing the currently-executed program and data related thereto. Predetermined address regions of the RAM 3 are allocated and used as registers, flags, tables, memories, etc.

Panel operator unit 4A includes various switches and operators for setting various parameters to be used for mixing (i.e., synthesizing) a plurality of video picture signals received via a plurality of video input channels and setting parameters to be used for imparting a predetermined effect to input video pictures or mixed video picture, as will be later described in detail. Of course, the panel operator unit 4A may include various other operators, such as a ten-button keypad for entry of numeric value data and a keyboard for entry of text data, that are to be used for selecting, setting or controlling other functions than the parameter setting functions. The operation detection circuit 4 constantly detects respective operational states of the individual switches and other operators on the panel operator unit 4A and outputs switch information, corresponding to the detected operational states of the operators, to the CPU 1 via the communication bus 1D.

The display circuit 5 visually displays various video pictures, such as video pictures after mixing or synthesis of video picture signals received via a plurality of video input channels as well as video pictures of the individual video input channels before mixing, on a display device 5A that may be in the form of an LCD (Liquid Crystal Display) or CRT (Cathode Ray Tube). In addition, the display circuit 5 can visually display, on the display device 5A, settings of various parameters in the individual video input channels, controlling state of the CPU 1, etc.

The picture processing section 6 includes at least a video input circuit, a picture mixing circuit, a picture effect circuit and a picture output circuit. The picture processing section 6 performs a picture synthesis process, effect impartment process, etc. and outputs each of the video pictures, created by the processes, to the display circuit 5. Details of the video input circuit, picture mixing circuit, picture effect circuit and video picture output circuit of the processing section 6 will be described later. Note that the above-mentioned display device 5A may include various display elements for showing video pictures to a human operator or user, or one or more human viewers or audience.

The external storage device 7 is provided for storing settings of the individual switches and other operators on the panel operator unit 4A at a predetermined time point, e.g., when any one of first to eighth scene buttons Sc1-Sc8 and a scene store button of FIG. 2 have been depressed simultaneously as will be later described in detail. The external storage device 7 also stores various programs to be executed by the CPU 1, and the like. Where a particular control program is not prestored in the ROM 2, the control program may be prestored in the external storage device (e.g., hard disk device) 7, so that, by reading the control program from the external storage device 7 into the RAM 3, the CPU 1 is allowed to operate in exactly the same way as in the case where the particular control program is stored in the program memory 2. This arrangement greatly facilitates version upgrade of the control program, addition of a new control program, etc. The external storage device 7 may use any of various removable-type media other than the hard disk (HD), such as a floppy disk (FD), compact disk (CD-R (Recordable), CD-RW (Rewritable) or the like), magneto-optical disk (MO), ZIP disk or DVD (Digital Versatile Disk) and semiconductor memory.

The MIDI interface (I/F) 8 is provided for receiving or delivering MIDI tone information (e.g., MIDI data) from or to external MIDI equipment 8A or the like. Note that the other MIDI equipment 8A may be of any type, such as a keyboard type, guitar type, wind instrument type, percussion instrument type or gesture type for attachment to a part of a human operator or user, as long as it can generate MIDI data in response to manipulations by the user. Further, the communication interface 9 is connected to a wired or wireless communication network 9B, such as a LAN (Local Area Network), the Internet or telephone line network, via which it may be connected to a desired sever computer 9A so as to input a control program and audio and various other data to the video mixer apparatus VM. Thus, in a situation where a particular control program and various data are contained in neither the ROM 2 nor the external storage device 7 (e.g., hard disk), or when the control data and data are to be subjected to version upgrade, these control program and data can be downloaded from the server computer 9A via the communication interface 9. In such a case, the video mixer apparatus VM, which is a "client", sends a command to request the server computer 9A to download the control program and various data by way of the communication interface 9 and communication network 9B. In response to the command from the client, the server computer 9A delivers the requested control program and data to the video mixer apparatus VM via the communication network 9B. In turn, the video mixer apparatus VM receives the control program and data via the communication interface 9 and accumulatively store them in the external storage device (hard disk) 7. In this way, the necessary downloading of the control program and various data is completed.

Note that the MIDI interface 8 may be a general-purpose interface rather than a dedicated MIDI interface, such as RS232-C, USB (Universal Serial Bus) or IEEE1394, in which case other data than MIDI tone information may be communicated at the same time as the video picture data. In the case where such a general-purpose interface as noted above is used as the MIDI interface 8, the other MIDI equipment 8A may be designed to communicate other data than MIDI tone information. Of course, tone information handled in the present embodiment may be based on other standard than the MIDI standard such as the SMF format, in which case the MIDI interface 8 and other MIDI equipment 8A are constructed in conformity to the data format employed.

Figure 2:
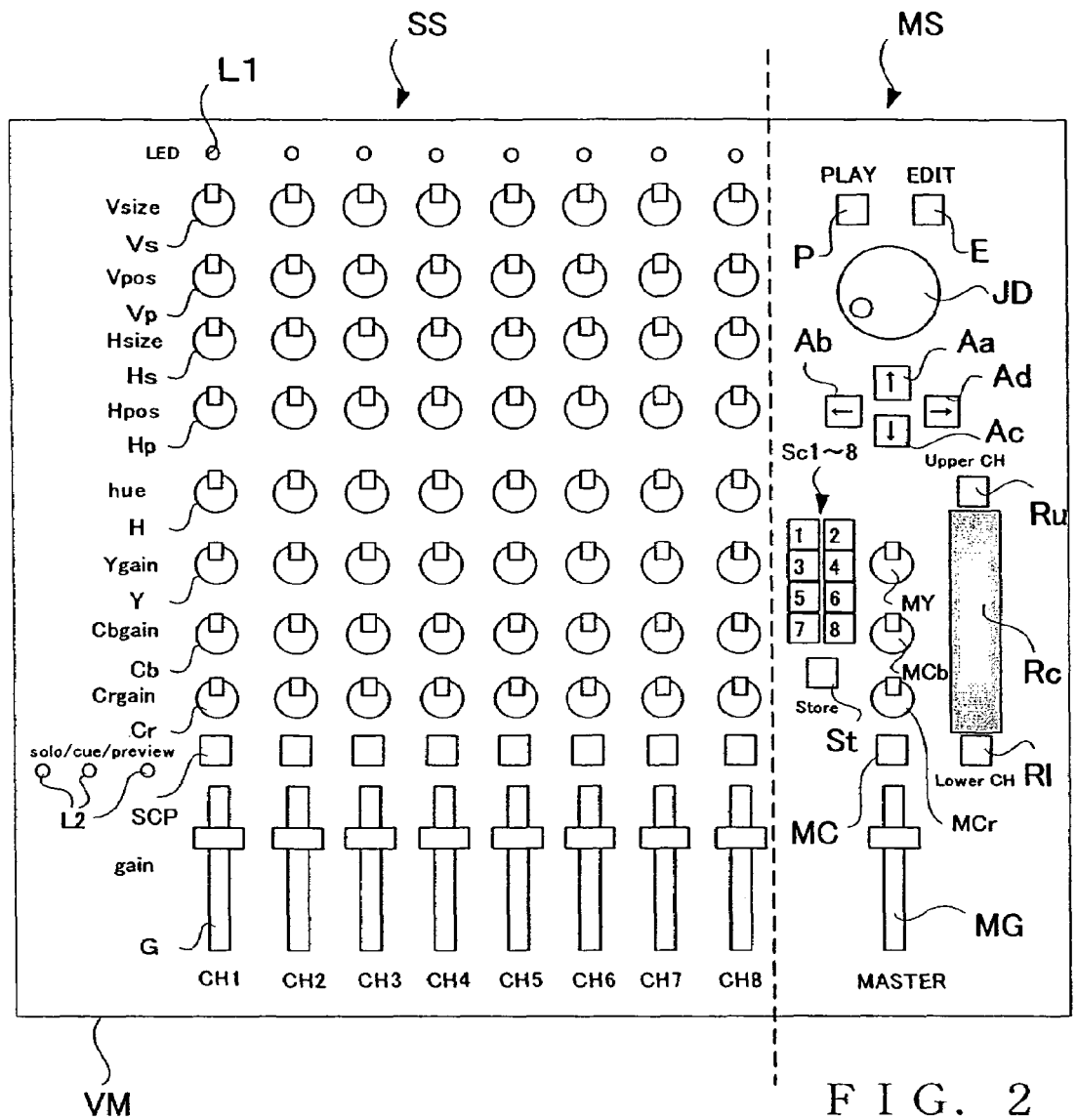
FIG. 2 is a conceptual diagram showing a specific structure of a panel operator unit in the video mixer apparatus of FIG. 1.

The following paragraphs describe a specific structure of the panel operator unit 4A in the video mixer apparatus VM, with reference to FIG. 2 that shows the various switches and other operators on the operator unit 4A. In this figure, the video mixer apparatus VM is shown as having eight video input channels, and the panel operator unit 4A is constructed accordingly. As shown in FIG. 2, the switches on the panel operator unit 4A of the apparatus VM are classified into two major groups, a sub-switch group SS and a main switch group MS, details of which will be described below for each of such switch groups SS and MS.

The sub-switch group SS includes, for each of the eight video input channels CH1-CH8 (hereinafter also referred to as "channels"), a "Vsize" switch Vs, "Vpos" switch Vp, "Hsize" switch Hs, "Hpos" switch Hp, hue switch H, "Ygain" switch Y, "Cbgain" switch Cb, "Crgain" switch Cr, "solo/cue/preview" button SCP, gain slider G. These switches of the sub-switch group SS are used for making various settings for controlling video picture signals input via the channels CH1-CH8 (input video pictures) on a channel-by-channel basis.

Each of the "Vsize" switches Vs provided in corresponding relation to the channels is operable to adjust or vary a vertical dimension of a video picture input via the corresponding channel. For example, by turning the "Vsize" switch Vs in clockwise and counterclockwise directions of FIG. 2, the user or human operator can switch the vertical dimension of the input video picture among seven different dimension settings, 1/8, 1/4, 1/2, 1/1, 2, 4 and 8 times. For example, assuming that the "Vsize" switch Vs in the center position as shown in FIG. 2 represents the "1/1" dimension setting, the vertical dimension of the input video picture can be set stepwise to any desired one of the 1/2, 1/4 and 1/8 times by counterclockwise turning of the "Vsize" switch Vs, and similarly set stepwise to any desired one of the 2, 4 and 8 times by clockwise turning of the "Vsize" switch Vs. Each of the "Vpos" switches Vp provided in corresponding relation to the channels provided in corresponding relation to the channels is operable to adjust or vary a vertical position of the input video picture. For example, by turning the "Vpos" switch Vp in the clockwise and counterclockwise directions, the user can move stepwise the input video picture to any desired one of vertical axial coordinate positions obtained by vertically dividing a predetermined screen area of the display device 5A into eight segments. Each of the "Hsize" switches Hs provided in corresponding relation to the channels is operable to adjust or vary a horizontal dimension of a video picture input via the corresponding channel. For example, by turning the "Hsize" switch Hs in the clockwise and counterclockwise directions, the user can switch the horizontal dimension of the input video picture among seven different dimension settings, 1/8, 1/4, 1/2, 1/1, 2, 4 and 8 times, in generally the same manner as set forth above in relation to the "Vsize" switch Vs. Each of the "Hpos" switches Hp provided in corresponding relation to the channels is operable to adjust or vary a horizontal position of the input video picture. For example, by turning the "Hpos" switch Hp in the clockwise and counterclockwise directions, the user can move stepwise the input video picture to any desired one of horizontal axial coordinate positions obtained by horizontally dividing the predetermined screen area of the display device 5A into eight segments.

Figure 3:
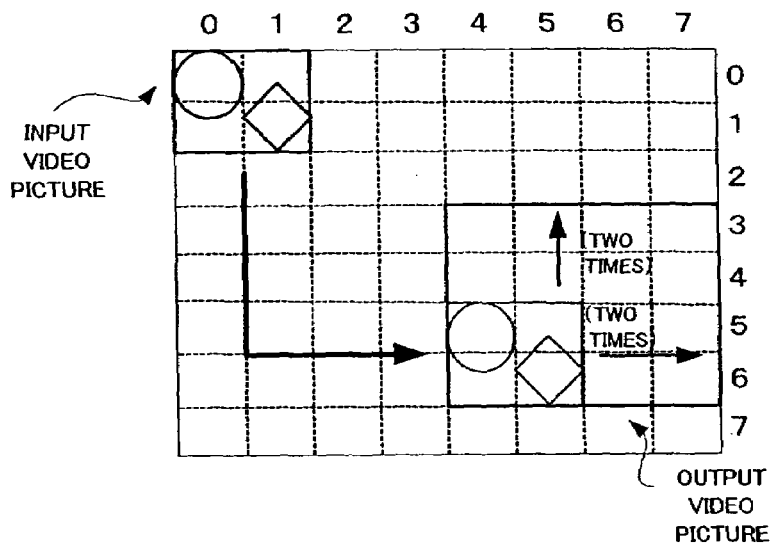
FIG. 3 is a diagram showing an example of a screen display based on settings of a "Vsize" switch, "Vpop" switch, "Hsize" switch and "Hpos" switch.

FIG. 3 is a conceptual diagram showing an example of a screen display based on settings of the above-mentioned "Vsize" switch Vs, "Vpos" switch Vp, "Hsize" switch Hs and "Hpos" switch Hp. In the figure, a horizontal row of numbers "0"-"8" represents the eight horizontal axial coordinate positions or blocks on the display screen, while a vertical row of numbers "0"-"8" represents the eight vertical axial coordinate positions or blocks on the display screen.

When the horizontal and vertical positions of the input video picture are both set to "0" and the input video picture is to be displayed on the screen as it is, the input video picture is displayed in an upper left position of the screen with a size as illustrated (input video picture IN). If, then, the "Vsize" switch Vs is set to "2 times", the "Vpos" switch Vp to "3", the "Hsize" switch Hs to "2 times" and the "Hpos" switch Hp to "4" for the input video picture IN, the input video picture IN is re-displayed as an output video picture having both of the vertical and horizontal dimensions increased by two times with a reference point located at a upper left corner of a rectangular screen block specified by the vertical axial coordinate position "3" and horizontal axial coordinate position "4". Namely, for each of the channels CH1-CH8, the combined use of the "Vsize" switch Vs, "Vpos" switch, "Hsize" switch Hs and "Hpos" switch Hp allows the input video picture to be displayed with a desired size in a desired position on the display screen.

Referring back to FIG. 2, each of the hue switches H provided in corresponding relation to the channels is operable to adjust a hue of a video picture input via the corresponding channel. Each of the "Ygain" switches Y provided in corresponding relation to the channels is operable to adjust a gain of a Y signal, i.e. luminance signal, of a video picture input via the corresponding channel. Each of the "Cbgain" switches Cb provided in corresponding relation to the channels is operable to adjust a gain of a Cb signal, i.e. color difference Cb signal, of the video picture input via the corresponding channel. Each of the "Crgain" switches Cr provided in corresponding relation to the channels is operable to adjust a gain of a Cr signal, i.e. color difference Cr signal Cr, of the video picture input via the corresponding channel. The gain adjustments of the above-mentioned Y signal, Cr signal and Cb signal are made here by performing predetermined arithmetic operations using respective special preset tables or the like on the basis of settings determined linearly or nonlinearly (in this case, gain curves are provided) or randomly in accordance with respective operated amounts of the switches.

Further, each of the "solo/cue/preview" buttons SCP provided in corresponding relation to the channels is operable to select any one of the channels CH1-CH8 to be processed in accordance with a solo function, cue function or preview function. As will be later described in detail, the cue function and preview-function are intended to display only a video picture of a desired channel on the display device 5A for the human operator in a given style so that the human operator can previously ascertain contents of a video picture to be created for the desired channel prior to display on the display device 5A provided for the audience (audience display device 5A). The solo function is intended to display only a video picture of any one of the channels CH1-CH8 on the audience display device 5A.

Each of the gain sliders (also called "faders") G provided in corresponding relation to the channels is operable to adjust the gains of the luminance and color difference signals (i.e., Y signal, Cr signal and Cb signal) for the corresponding channel CH1-CH8. Namely, whereas the above-described "Ygain" switch Y, "Cbgain" switch Cb and "Crgain" switch Cr are for individually or independently adjusting the gains of the Y, Cr and Cb signals, the gain sliders G are for simultaneously adjusting the gains of the Y, Cr and Cb signals in a collective fashion. Gain adjustment by the gain slider G is carried out by performing a predetermined arithmetic operation using a preset special table or the like on the basis of settings determined linearly or nonlinearly (in this case, a gain curve is provided) or randomly in accordance with an operated amount of the slider G. Thus, the input video picture in question can be displayed, for example, in a clearer hue with a lighter impression as the gain slider G is moved upward, while the input video picture can be displayed in a fainter hue with a darker impression as the gain slider G is moved downward. Of course, the gain slider G is not limited to such functions; for example, in the case where the gain adjustment by the gain slider G is carried out by performing the predetermined arithmetic operation using the preset special table, the functions of the gain slider G may be set to permit a picture display such that the input video picture is imparted with a novel effect such as an inverse video effect, the input video picture may be caused to be transparent with respect to an overlapping video picture instead of blacking out (namely, the video picture input via the corresponding channel in this case is treated as if it were not present), or the input video picture may be displayed in a picture-in-picture (PinP) mode with an upper-order layer prevented from being mixed with a portion of a lower-order layer.

By virtue of the provision of the above-described switches for controlling the video picture signals input via the channels CH1-CH8 on the channel-by-channel basis, the video picture signals input via the channels CH1-CH8 can be synthesized at a desired synthesis ratio corresponding to operation of the switches, so that the human operator is allowed to readily enhance expression of an output video picture.

As also seen in FIG. 2, the panel operator unit 4A further includes a plurality of LEDs L1 disposed immediately above the respective "Vsize" switches Vs, and the LEDs L1 are each operable to ascertain a signal input via the corresponding channel CH1-CH8. Namely, from illuminating states of these LEDs L1, the human operator can ascertain, for each of the channels CH1-CH8, whether there has been input a video picture signal via the corresponding channel. For example, the LED L1 is illuminated or blinked if there has been input a video picture signal via the corresponding channel, but left turned off or deilluminated, without being illuminated or blinked, if there has been input no video picture signal via the corresponding channel. In case any one of the LEDs L1 is left turned off or deilluminated although there has been input a video picture signal via the corresponding channel, this means that there is some faulty connection in the channel or a reproducing medium for the channel is malfunctioning. In such a case, the human operator can readily identify the channel having that inconvenience, on the basis of the illuminated (or blinked) and deilluminated states of the LEDs L1. Further, in a music concert, discotheque club or the like where the human operator has to perform picture inputting operation, such as depression of a video reproduction switch, under low light conditions, an operation error, such as a failure to display a video picture due to human operator's forgetting about depression of a predetermined switch, can be advantageously discovered prior to a change from one screen to another.

Further, another plurality of LEDs L2 are disposed immediately below a label "solo/cue/preview" in a lower region of the operator unit 4A. When a later-described "solo/cue/preview" switching button MC of the main switch group MS has been depressed to change one function to another, any one of the LEDs L2 immediately below the other function is turned on or illuminated. For example, when the solo function (or cue or preview function) has been selected, only the LED L2 immediately below the label "solo" (or "cue" or "preview") is illuminated. In this way, the human operator can readily ascertain in which one of the solo/cue/preview functions the video mixer apparatus VM is now operating.

The following paragraphs describe various switches of the main switch group MS. As shown in FIG. 2, the main switch group MS includes the first to eight scene buttons Sc1-Sc8, scene store button St, edit button E, play button P, jog dial JD, arrow buttons (" "" "" " and " " buttons) Aa-Ad, master "Ygain" switch MY, master "Cbgain" switch Mcb, master "Crgain" switch Mcr, "solo/cue/preview" switching button MC, ribbon-controller-operated upper channel setting button Ru, ribbon-controller-operated lower channel setting button Rl, ribbon controller Rc, and master gain slider MG. These switches of the main switch group MS are used for making various settings to control a video picture signal, i.e. a signal resulting from synthesis of video picture signals input via the channels CH1-CH8, that is to be supplied to a master channel (i.e., an output channel).

The scene buttons Sc1-Sc8 and scene store button St are operable to retain settings of the individual switches of a predetermined one of switch groups on the panel operator unit 4A at a time point when these buttons are operated. Namely, if any one of the scene buttons Sc1-Sc8 is depressed while the scene store button St is being depressed, the current settings of the individual switches can be stored in association with any one of the scene buttons Sc1-Sc8. Then, if only the one of the scene buttons Sc1-Sc8 is depressed after the switch setting storage, the settings of the individual switches of the predetermined switch group on the operator unit 4A, stored in association with the scene button, can be reproduced.

The edit button E is operable to set the entire video mixer apparatus VM in an edit mode. In this embodiment, the edit mode is a parameter editing mode in which the user or human operator is allowed to set or change parameters (such as mathematical expressions and values) to be used for arithmetical or logical operations on the Y, Cr and Cb signals of the individual channels CH1-CH8. Specifically, mathematical expressions such as addition and subtraction in the case of the arithmetical operations, and logical expressions such as AND, OR and XOR in the case of logical operations can be set or changed using, as mathematical values, numerical values of desired eight bits of the Y, Cr and Cb signals. The play button P is operable to set the video mixer apparatus VM in a play mode to permit video picture editing. The video mixer apparatus VM is normally set in the play mode in response to powering-on of the apparatus VM, and thus the play button P, after the powering-on, is used primarily for terminating the edit mode to set the apparatus VM back to the play mode. The jog dial JD is an rotary operator that is used for increasing or decreasing arithmetic values for respective desired values (eight-bit binary numbers) of the Y, Cr and Cb signals or changing mathematical expressions as it is turned by the user or human operator, for example, in the edit mode. In other words, the jog dial JD is used for setting or changing parameter values with which arithmetic or logical operations are to be performed for the Y, Cr and Cb signals of the individual channels.

The " " button Aa is operable to move upward a cursor to point to an object to be changed or edited in the edit mode, the " " button Ab is operable to move downward the cursor in the edit mode, the " " button Ac is operable to move rightward the cursor in the edit mode, and the " " button Ad is operable to move leftward the cursor in the edit mode. Namely, by moving the cursor on the display device 5A in any of the upward, downward, rightward and leftward directions using any of the arrow buttons Aa-Ad, the user or human operator can select an object (Y signal, Cr signal, Cb signal or the like) for which specific parameters are to be set or changed in the edit mode, as will be later described in detail.

The master "Ygain" switch MY is operable to adjust the gain of the Y signal of the master channel. The gain of the Y signal is calculated from a preset special table or by operating the table on the basis of the logical or arithmetic operation having been set in the edit mode. The master "Cbgain" switch MCb is operable to adjust the gain of the Cb signal of the master channel. The gain of the Cb signal is calculated from a preset special table or by operating the table on the basis of the logical or arithmetic operation having been set in the edit mode. The master "Crgain" switch MCr is operable to adjust the gain of the Cr signal of the master channel. The gain of the Cr signal is also calculated from a preset special table or by operating the table on the basis of the logical or arithmetic operation having been set in the edit mode. The "solo/cue/preview" switching button MC is operable to select any one of the solo, cue and preview functions to be performed by the video mixer VM. Shift can be made between the solo, cue and preview functions in the mentioned order each time the switching button MC is depressed. More specifically, when the video mixer apparatus VM is in the solo function mode, a last operated (most-recently operated) channel CH1-CH8 is selected (the first channel CH1 is selected at the very initial stage), and the mixer apparatus VM awaits operation, by the user or human operator, of the "solo/cue/preview" button SCP. Once the "solo/cue/preview" button SCP for the selected channel CH1-CH8 is operated, only a video picture input via the selected channel is selected and displayed on the audience display device 5A. Because such a video picture is displayed along with information indicative of a displayed position, size, etc. of the video picture, the solo function can be suitably used, for example, in a case where the human operator or the like desires to ascertain which channel is located in which position. When the mixer apparatus VM is in the cue function mode, video pictures of all of the eight channels CH1-CH8 are simultaneously displayed on a single screen, with the video pictures of two channels arranged per vertical column on the screen and the video pictures of four channels arranged per horizontal row on the screen. Once the "solo/cue/preview" buttons SCP for the channels CH1-CH8 are operated in the cue function mode, the input video pictures of all the channels CH1-CH8 are delivered to monitor lines for simultaneous display on the monitor, so that it is possible for the human operator to visually ascertain what the input video pictures are like. Further details of these functions will be given later. The master gain slider (also called "master fader") is operable to adjust a gain, hue and the like of the master channel. The gain and hue of the master channel are calculated from a preset special table or by operating the table on the basis of the logical or arithmetic operation having been set in the edit mode.

The individual switches of the sub-switch group SS and main switch group MS on the panel operator unit 4A may be constructed as moving operators (i.e., moving faders), and when the settings of the switches of a predetermined switch group on the panel operator unit 4A are to be reproduced in response to operation of any one of the scene buttons Sc1-Sc8, the switches may be automatically moved from the current positions or settings to the to-be-reproduced positions or settings. By thus constructing the individual switches as moving operators so as to operate in an automatic fashion, it is possible to automatically move the individual switches upward or downward in response to a shift from one scene to another executed by operation of any one of the scene buttons Sc1-Sc8. Because the individual switches are moved to follow the respective settings of the switches for reproducing the scene stored in association with the operated scene button Sc1-Sc8 as set forth above, the human operator can appropriately manipulate the switches to edit the scene. Thus, it is possible to prevent an accident that an unexpected video picture is output due to variation in one or more particular values unexpected by the human operator when the human operator operates the switches to edit the scene. Of course, the individual switches need not necessarily be constructed as moving operators, and the current settings of the switches may be replaced with the settings of the individual switches for reproducing a scene stored in association with the operated scene button Sc1-Sc8.

Figure 4:
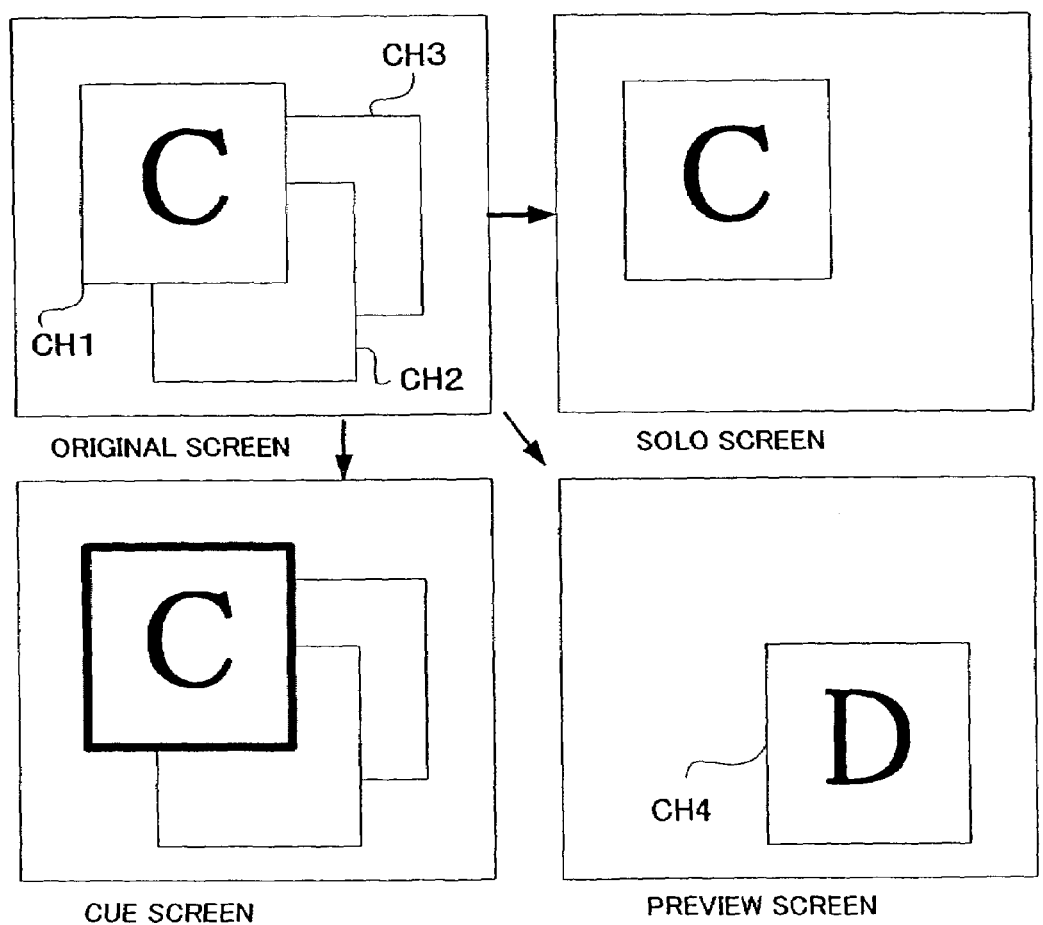
FIG. 4 is a conceptual diagram explanatory of solo, cue and preview functions of the video mixer apparatus.

Now, the following paragraphs describe the solo, cue and preview functions, with reference to FIG. 4 that is a conceptual diagram explanatory of the solo, cue and preview functions. As noted above, the cue and preview functions are intended to display a video picture on the display device 5A for the human operator, while the solo function is intended to display a video picture on the audience display device 5A. By operating the "solo/cue/preview" switching button MC, the human operator can sequentially switch between the solo, cue and preview functions. Here, these functions are explained in relation to a case where video pictures are input via four channels CH1-CH4. Further, although the video pictures input via the channels CH1-CH3 are shown separately in FIG. 4, these video pictures are, in practice, displayed together on the screen as a single synthesized video picture; on an "original screen" shown in the figure, overlapping portions of the input video pictures represent a synthesized area of the video pictures.

First, a description is made about the solo function. When video pictures input via the channels CH1-CH3 are synthesized and delivered to the audience display device 5A, an "original screen" is displayed to the audience in a manner as shown in an upper left section of FIG. 4. Namely, in this case, the original screen shows a single video picture obtained by synthesizing the input video pictures of the channels CH1-CH3. If only the video picture of the first channel CH1 constituting the original screen is to be displayed to the audience, the human operator depresses the "solo/cue/preview" switching button MC to place the video mixer apparatus VM in the solo function mode, in response to which the LED L2 immediately below the indication "solo" is turned on. When the human operator depresses the "solo/cue/preview" button SCP corresponding to a desired one of the channels (e.g., channel CH1) under this condition, only the video picture input via the channel CH1, for which the "solo/cue/preview" button SCP has been depressed, is displayed on the audience display device in a position designated via the "Vpos" and "Hpos" switches corresponding to the channel CH1, with a size designated via the "Vsize" and "Hsize" switches and a luminance and hue designated via the corresponding hue, "Ygain", "Cbgain", "Crgain" switches and gain slider ("solo screen"). Namely, the solo function is a function for selecting only one input video picture of a single particular channel selected from among a plurality of video pictures constituting a synthesized video picture and displaying the selected video picture to the audience. This solo function is useful in that the human operator can use the solo function to display only an input video picture of a desired channel in a desired display style.

Next, a description is made about the cue function. When video pictures input via the channels CH1-CH3 are synthesized and delivered to the audience display device 5A, an "original screen" as shown in the upper left section of FIG. 4 is displayed to the audience. Of course, the same screen is displayed to the human operator. However, if contents of the video picture input via one of the channels (e.g., first channel CH1) are to be changed, the human operator can not ascertain from the original screen alone which of the input video pictures is of the first channel CH1. Thus, the human operator depresses the "solo/cue/preview" switching button MC to place the video mixer apparatus VM in the cue function mode, in response to which the LED L2 immediately below the indication "cue" is turned on. When the human operator depresses the "solo/cue/preview" button SCP corresponding to the channel CH1 under this condition, the video picture input via the channel CH1 is displayed to the human operator with a frame thicker than frames of the video pictures input via the other channels CH2 and CH3 ("cue screen"). Namely, the cue function is a function for selecting only one input video picture of a single particular channel selected from among a plurality of video pictures constituting a synthesized video picture and displaying the selected video picture to the human operator in accordance with a designated position and size in such a manner as to distinguish the selected video picture of the particular channel from the video pictures input via the other channels. This cue function is useful in that it allows the human operator to promptly ascertain in which positions on the screen the individual video pictures input via the channels have been placed and synthesized.

For the cue function, there may be provided touch sensors in corresponding relation to the gain sliders corresponding to the channels CH1-CH8 so that once the human operator only touches any one of the gain sliders, only the video picture input via one of the channels corresponding to the touched gain slider is selected and displayed to the human operator in accordance with a designated position and size in such a manner as to distinguish the selected video picture from the video pictures input via the other channels. Instead of being displayed distinguishably with a thicker frame alone, the selected video picture may be displayed not only with a different frame but also in a different color, such as a red color, from the video pictures input via the other channels. Further, the frame of the video picture input via the particular channel may be of any desired color, and the frame color may be differentiated between the channels.

Further, a description is made about the preview function. When video pictures input via the channels CH1-CH3 are synthesized and delivered to the audience display device 5A, an "original screen" is displayed to the audience as shown in the upper left section of FIG. 4. If the video picture input via the fourth channel CH4 is to be synthesized with the synthesized video picture of the channels CH1-CH3, the human operator may desire to synthesize these video pictures after ascertaining, in advance, respective displayed positions, sizes and contents of the video pictures. Thus, in such a case, the human operator depresses the "solo/cue/preview" switching button MC to place the video mixer apparatus VM in the preview function mode, in response to which the LED L2 immediately below the indication "preview" is turned on. When the human operator depresses the "solo/cue/preview" button SCP corresponding to the fourth channel CH4 under this condition, only the video picture input via the selected fourth channel CH4 is displayed to the human operator ("preview screen"). Namely, even when the gain slider corresponding to the selected channel (in this case, fourth channel CH4) whose input video picture is to be newly synthesized (and hence settings are normally made for displaying a sheer black video picture for the selected channel), the preview function can display to the human operator exactly the same video picture as when the corresponding gain slider is in a predetermined reference position (e.g., a position allowing display of the input original video picture itself. If the thus-synthesized video picture is to be displayed to the audience after termination of the preview function mode, the synthesized video picture can not be displayed to the audience unless the gain slider is moved upward from the lowest position. Namely, the preview function is a function for displaying only a video picture to be newly synthesized with an already-synthesized video pictures of other channels so that the human operator can ascertain, in advance, a displayed position and size of the video picture to be newly synthesized. This preview function is very useful in that it allows the human operator to promptly make adjustment as to with which size and in which position on the screen the video picture to be newly synthesized should be displayed for picture synthesis.

Referring back to FIG. 2, the ribbon-controller-operated upper channel setting button Ru is operable to set any desired one of the channels CH1-CH8 as an upper channel for which a synthesis ratio is to be manipulated with the ribbon controller Rc, by being depressed along with the "solo/cue/preview" button SCP corresponding to the desired channel. Similarly, the ribbon-controller-operated lower channel setting button Rl is operable to set any desired one of the channels CH1-CH8 as a lower channel for which the synthesis ratio is to be manipulated with the ribbon controller Rc, by being depressed along with the "solo/cue/preview" button SCP corresponding to the desired channel. The ribbon controller Rc employed in this embodiment is a conventional contact-type controller, and the human operator can instantaneously vary the synthesis ratio between video picture signals of the two channels (i.e., ribbon-controller-operated upper channel and ribbon-controller-operated lower channel Ru and Rl) having been set by the ribbon-controller-operated upper channel setting button Ru and ribbon-controller-operated lower channel setting button Rl, respectively, by just touching an appropriate position of the ribbon controller Rc with his or her finger or the like. Of course, the human operator can continuously vary the synthesis ratio between the video picture signals by continuously moving his or her finger on and along the ribbon controller Rc. Namely, the ribbon controller Rc is employed here in place of the traditional T-Bar; however, unlike the traditional T-Bar, the ribbon controller Rc can readily set a synthesis ratio between two channels to a desired value without having to be continuously operated up to a position where a desired synthesis ratio can be achieved. Further, because the human operator can set desired ones of the channels CH1-CH8 as the ribbon-controller-operated upper channel Ru and ribbon-controller-operated lower channel Rl, the human operator can freely set a combination of video pictures (i.e., combination of channels) for which the synthesis ratio is to be varied promptly.

Further, gains of the desired channels having been thus set as the ribbon-controller-operated upper channel and ribbon-controller-operated lower channel Ru and Rl can be adjusted via the corresponding gain sliders G, and it goes without saying that variation in the synthesis ratio by the operation of the ribbon controller Rc can be modified in accordance with settings of the corresponding gain sliders G.

Figure 5:
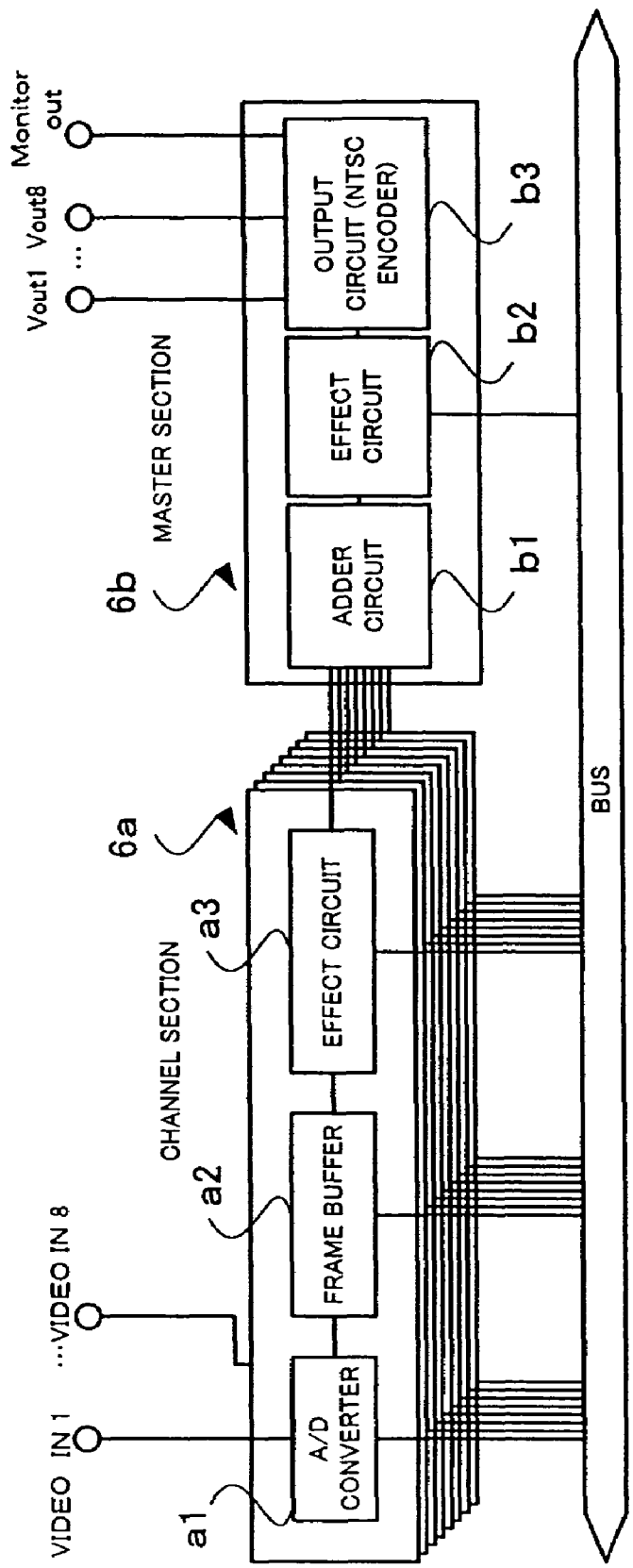
FIG. 5 is a block diagram showing an exemplary setup of a picture processing section in the video mixer apparatus.

The following paragraphs describe a picture input circuit, picture mixing circuit, picture effect circuit and picture output circuit in the picture processing section 6 of FIG. 1, with reference to FIG. 5 that is a block diagram showing an exemplary setup of the picture processing section 6. In the illustrated example of FIG. 5, Y/C-separating A/D converters a1 and output-synchronizing frame buffers a2 constitute the picture input circuit, adders b1 constitutes the picture mixing circuit, effect circuits a3 and b2 constitute the picture effect circuit, and output circuits b3 constitute the picture output circuit.

Channel section 6a includes, for each of the first to eighth channels CH1-CH8, one Y/C-separating A/D converter a1, output-synchronizing frame buffer a2 and effect circuit a3, and this channel section 6a operates in accordance with settings of the individual switches of the sub-switch group SS corresponding to the channels CH1-CH8. For each of the channels CH1-CH8, the Y/C-separating A/D converter a1 (also called a "decoder" in the field of video processing) is a device for converting an analog composite signal (i.e., a composite video picture signal comprising a combination of a video picture signal, burst and composite synchronizing signal), input via one of input terminals VIDEO IN1-VIDEO IN8, into digital component signals. Namely, by converting the composite video picture signal into the component signals, the AND converter a1 generates, from the composite video picture signal, three different signals: a luminance signal (Y signal); a color difference signal (Cb signal); and a color difference signal (Cr signal). The frame buffer a2 is a standalone dedicated device for displaying a digital video picture on the display device 5A such as the liquid crystal display device (LCD) or cathode ray tube (CRT), and this frame buffer a2 is used by being connected to, for example, to a picture processing computer. Namely, each digital video picture received by the frame buffer a2 is stored in an inner frame memory of the picture processing computer, and then the picture processing computer generates a signal to be supplied to the display device 5A. In many cases, the picture processing computer is equipped with a function of storing a succession of video pictures to reproduce them as an animated picture, a zoom-in/out or scroll function, or a function of inserting a subtitle. Whereas video picture signals are input asynchronously via the channels CH1-CH8 into the video mixer apparatus VM, the individual components of the mixer apparatus VM output the video picture signals at their respective independent timing, and thus, if no appropriate measures are taken, video pictures would be output in an disorderly manner due to absence of synchronism therebetween. Thus, in the instant embodiment, video pictures are temporarily stored in the frame buffer a2, and the thus-stored video pictures are all output from the frame buffer a2 at accurately-calculated synchronized timing in order to prevent output of disorderly video pictures.

The effect circuit a3 is a circuit for synthesizing video pictures or changing a displayed dimension or size and/or position of a designated video picture. Specifically, the effect circuit a3 imparts predetermined effects to a designated video picture in accordance with settings of the predetermined switches of the corresponding channel CH1-CH8, such as the "Vsize" switch Vs for designating a vertical dimension, "Vpos" switch Vp for designating a vertical position, "Hsize" switch Hs for designating a horizontal dimension, "Hpos" switch Hp designating a horizontal position, hue switch H for designating a hue or tint, "Ygain" switch Y for designating a luminance gain, "Cbgain" switch Cb for designating a color difference gain, "Crgain" switch Cr for designating a color difference gain and the gain slider G of the corresponding channel for simultaneously changing the luminance and hue on the basis of the inner tables of the Y (luminance) signal and Cr and Cb (color difference) signals.

Master section 6b of FIG. 5 includes an adder circuit b1 for YUV signals (one designation of luminance and color difference signals, and the YUV signals are similar to YCrCb signals), a picture synthesizing effect circuit b2 and an output encoder b3, which operates in accordance with settings of the individual switches of the main switch group MS. The YUV-signal adder circuit b1 adds together signals of every pair of the eight channels CH1-CH8 to thereby generate signals of four channels, then adds together the signals of every two of the four channels to thereby generate signals of two channels, and then adds together signals of the two channel to thereby generate a signal of just one channel. Namely, the YUV-signal adder circuit b1 is a circuit for mixing or synthesizing video pictures input via the channels CH1-CH8 to create a single video picture. The picture synthesizing effect circuit b2 imparts the video picture, having been created by mixing or synthesizing the input video pictures as noted above, effects in accordance with current settings of the master "Ygain" switch for changing the gain of the Y or luminance signal, master "Cbgain" switch for changing the gain of the Cb or color difference gain, master "Crgain" switch for changing the gain of the CR or color difference gain and the master gain slider for simultaneously changing the gains of the Y, Cr and Cb signals (luminance and color difference signals).

The output circuit b3, which comprises an NTSC encoder (commonly known as "color encoder" in the field of video picture processing), creates a composite signal from the component video picture signals, i.e. the Y, Cr and Cb signals, and outputs the thus-created composite signal via an output terminal (any one of terminals Vout1-Vout8, Monitorout, etc.) to predetermined picture display equipment. Note that the output circuit b3 may include a matrix circuit, modulation circuit and/or the like although not specifically shown here. Further, each of the signals output from the effect circuit a3 of the channel section 6a need not necessarily be passed via the adder circuit b1 and effect circuit b2 to the output circuit b3, and it may of course be passed directly to the output circuit b3. For example, in the case where the above-described solo function, cue function or preview function is performed, each of the signals output from the effect circuit a3 of the channel section 6a is passed directly to the output circuit b3. In this way, screen display can be implemented during execution of the solo function, cue function or preview function.

In practice, the above-described video mixer apparatus VM is connected with a plurality of video picture input devices and video picture output devices, so that the mixer apparatus VM and picture input and out devices are used as a single picture editing system. Therefore, the following paragraphs describe the picture editing system using the video mixer apparatus VM of the present invention, with reference to FIG. 6 that is a block diagram showing an embodiment of the picture editing system using the video mixer apparatus VM.

Figure 6:
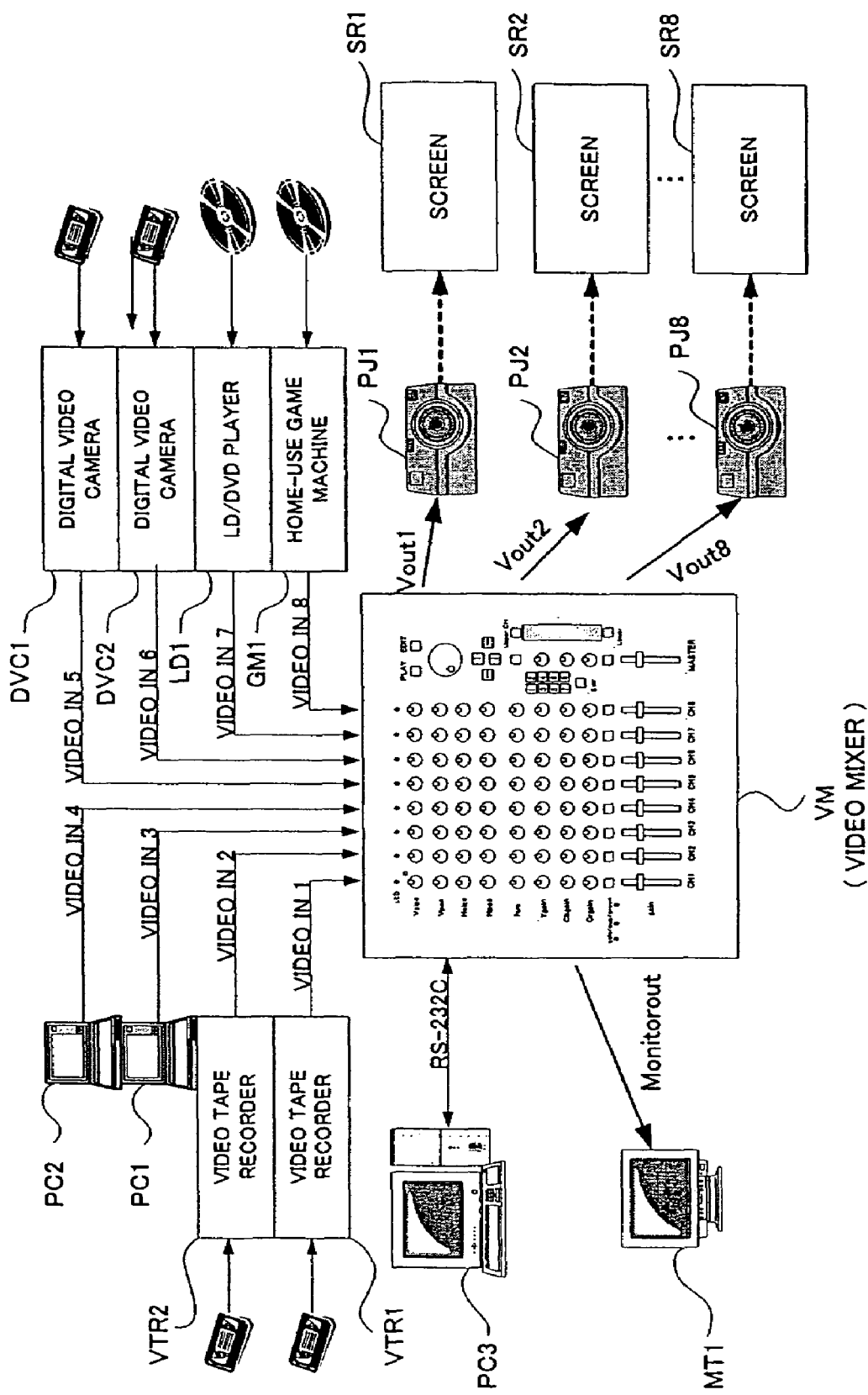
FIG. 6 that is a block diagram showing an embodiment of a picture editing system using the video mixer apparatus of the present invention.

In the illustrated example of FIG. 6, the video mixer apparatus VM includes input terminals VIDEO IN1-VIDEO IN8 for receiving composite signals of eight channels. The composite signal input terminals and composite signal output terminals of desired external video picture devices (picture input devices) are connected via RCA pin cables for video picture communication. For example, the first and second composite signal input terminals VIDEO IN1 and VIDEO IN2 of the video mixer apparatus VM are connected via RCA pin cables with composite signal output terminals of video tape recorders VTR1 and VTR2. The video tape recorders VTR1 and VTR2 each reproduce, from a video tape, still or animated pictures previously created by computer graphics on a personal computer, video pictures taken by a video camera, or video pictures recorded from a TV or other media. The third composite signal input channel VIDEO IN3 is connected via an RCA pin cable with one of dual composite signal outputs of a video card attached to an expansion slot for a video board, such as a PCI slot or AGP slot, of a personal computer PC1. The fourth composite signal input channel VIDEO IN4 is connected via an RCA pin cable to a converter device that converts a signal at a VGA output terminal of a personal computer PC2 into a composite signal output. In the personal computers PC1 and PC2, there are stored files of still or animated pictures previously created by computer graphics on the personal computer, video pictures taken by a video camera, or video pictures recorded from a TV or other media. The personal computers PC1 and PC2 each use software for VJ (Video Jockey) to read out a desired one of the files of the still or animated pictures, and supplies the video mixer apparatus VM with preview video picture signals of an output video picture domain to be displayed after undergoing a special picture effect process such as a loop reproduction or division-into-four process.

The fifth and sixth composite signal input channels VIDEO IN5 and VIDEO IN6 of the video mixer apparatus VM are connected via RCA pin cables with composite signal output terminals of digital video cameras DVC1 and DVC2. Each of the digital video cameras DVC1 and DVC2 not only reproduces, from a video tape, still or animated pictures previously created by computer graphics on a personal computer, video pictures taken by a video camera or video pictures recorded from a TV or other media, but also supplies in real time the video mixer apparatus VM with video pictures of players of a band, DJ or audience present in a place of a music concert or the like. The seventh composite signal input channel VIDEO IN7 of the video mixer apparatus VM is connected via an RCA pin cable with a composite signal output terminal of an LD/DVD player LD1. The LD/DVD player LD1 reproduces video pictures recorded on a commercially-available LD/DVD disk, still or animated pictures previously created by computer graphics on a personal computer, video pictures taken by a video camera or video pictures recorded from a TV or other media. The eighth composite signal input channel VIDEO IN8 of the video mixer apparatus VM is connected via an RCA pin cable with a composite signal output terminal of a home-use game machine GM1. The home-use game machine GM1 reproduces video pictures from a commercially-available game CD-ROM or DVD disk, still or animated pictures previously created by computer graphics on a personal computer, video pictures taken by a video camera or video pictures recorded from a TV or other media.

The signal output terminal Monitorout of the video mixer apparatus VM is connected via an S video cable or pin cable with an NTSC monitor MT1 (picture output device) or the like. The NTSC monitor MT1 previews video pictures, with position and size information taken into account, when the solo function is selected, previews divided eight video picture screens when the cue function is selected, and previews video pictures of only a particular channel when the particular channel is selected.

The composite signal output terminals Vout1-Vout8 (or S video output terminals (not shown)) are connected, via RCA pin cables (or S video terminal cable), with composite video picture input terminals (S video input terminals) of the NTSC monitor MT1, and also with composite video picture input terminals (S video input terminals) of projectors PJ1-PJ8. Ultimate results of the video picture signals having been comprehensively processed by the video mixer apparatus VM are transmitted to the NTSC monitor MT1 or projectors PJ1-PJ8. The video picture signals, transmitted to the projectors PJ1-PJ8, are projected onto respective projector screens SC1-SC8 positioned about 2-50 m apart from the projectors PJ1-PJ8; in this case, the projectors PJ1-PJ8 each project a same video picture onto their respective screens SC1-SC8.

Figure 7A:
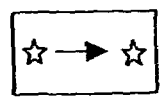
FIG. 7A is a diagram an example showing an input video picture.
Figure 7B:
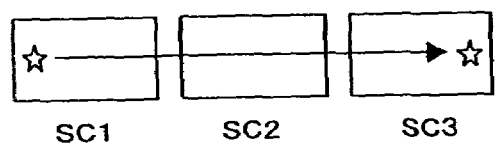
FIG. 7B is a conceptual diagram explanatory of a manner in which the input video picture of FIG. 7A is projected in accordance with a multi-screen scheme.

Instead of all the projectors PJ1-PJ8 projecting a same video picture onto the screens SC1-SC8, the projectors PJ1-PJ8 may project, onto the screens SC1-SC8, different portions of each video picture in a so-called multi-screen scheme. FIGS. 7A and 7B are conceptual diagrams explanatory of a manner in which a video picture is projected in accordance with the multi-screen scheme. Specifically, FIG. 7A shows an input video picture, and FIG. 7B conceptually shows video picture projection by the multi-screen scheme. Here, it is assumed that the composite signal input channel VIDEO IN1 is connected with video equipment that reproduces video picture signals representing a star mark " " moving in a left-to-right direction, and that the composite signal output terminals Vout1-Vout3 are connected with the projectors PJ1-PJ3.

In the case of video picture projection by the multi-screen scheme, and assuming that the composite signal output terminals Vout1-Vout3 have been selected as output terminals for the video picture signals, each of the input video pictures is output in horizontally expanded form with a left ⅓ portion of the input video picture output from the output terminal Vout1, a middle ⅓ portion of the input video picture output from the output terminal Vout2 and a right ⅓ portion of the input video picture output from the output terminal Vout3. Thus, the three projectors PJ1-PJ3, connected with the composite signal output terminals Vout1-Vout3, respectively, project the respective portions of each video picture onto their screens SC1-SC3 as shown in FIG. 7B. In this way, video pictures can be projected onto the screens SC1-SC3 as if the star mark " " were moving continuously from the left end of the left screen SC1, through the middle screen SC2, to the right end of the right screen SC3. By thus displaying video outputs of two or more channels on a plurality of the screens in the multi-screen scheme, it is possible to enhance a feeling of picture expansion. As a consequence, there can be accomplished the advantages that the entire place of the music concert or the like can be used efficiently in such a manner that more powerful video pictures can be displayed across the entire place.

It should be appreciated that the picture editing system shown in FIG. 6 may be constructed in any other suitable manner than the above-described. For example, the media reproduced by the video tape recorder may be any one of a VHS (trademark) type video tape, (trademark) type video tape and 8 mm video tape, or S-VHS type video tape and DV (Digital Video) tape, etc. Further, the digital video camera may be replaced with any other suitable video camera, such as an 8 mm video camera or simple video camera with no picture recording function. Furthermore, the picture editing system of FIG. 6 has been described above as attaching a video card having dual composite signal outputs to an expansion slot for a video board, such as a PCI or AGP slot. In an alternative, two video cards each having a single (not dual) composite signal output may be attached so that video pictures can be distributed to two channels, i.e. the monitor and the video picture output device. Moreover, there may be employed a video signal converting box for parallel connection, or the like. Furthermore, whereas the picture editing system of FIG. 6 has been described above as employing the device for converting a VGA output from a personal computer into a composite video picture output, the picture output device that can be incorporated in or connected to a personal computer may be of any desired type and may be connected in any desired manner.

Furthermore, various settings of the video mixer apparatus VM of the present invention may be remote-controlled by an external personal computer. Namely, if the RS-232C terminal of the video mixer apparatus VM is connected, via a 9-pin reverse serial cable, with the RS-232C terminal of the personal computer PC3 (FIG. 6), all of the operators on the panel operator unit 4A can be fully remote-controlled by the personal computer PC3, and the personal computer PC3 can fully edit video pictures using the video mixer apparatus VM. For example, a panel operator unit, similar to the unit 4A of FIG. 2, may be displayed on a display of the personal computer PC3 so that a human operator of the personal computer PC3 can manipulate the displayed panel operator unit with a mouse or the like; this way, the human operator of the personal computer PC3 can remote-control the panel operator unit 4A of the video mixer apparatus VM. Moreover, various data can be downloaded from an external personal computer to the video mixer apparatus VM of the present invention. For example, arithmetically-obtained output values of the YCrCb signals which correspond to various possible positions of the gain slider are preferably stored as table values in the RAM 3 of the video mixer apparatus VM; in such a case, the table values may be created, in advance, by the personal computer PC3 and downloaded to the video mixer apparatus VM upon request. With this arrangement, the arithmetically-obtained output values of the YCrCb signals can be custom-set in association with the gain sliders having their respective independent color variation tables corresponding to the channels, and thus the human operator or user of the video mixer apparatus VM can readily create a dedicated channel for special effect impartment.

With the picture editing system using the video mixer apparatus VM of the invention as shown in FIG. 6, the human operator, such as a VJ, can create video pictures fitting a music scene by synthesizing a plurality of input video pictures. Namely, for that purpose, the human operator adjusts the luminance, hue and the like of video pictures of the individual channels CH1-CH8 using the above-described hue, "Ygain", "Cbgain", "Crgain" switches and other operators of the sub-switch group shown in FIG. 2. Further, the human operator makes adjustments to the video pictures by manipulating the gain sliders corresponding to the input channels CH1-CH8 of the pictures in accordance with music performed by a band or DJ. Further, by appropriately inserting thus-adjusted video pictures and/or video pictures imparted with special effects such as a mosaic, posterization and film effect, it is possible for the displayed video pictures to further liven up a scene and, in some cases, play a role of providing total illumination.

Figure 8:
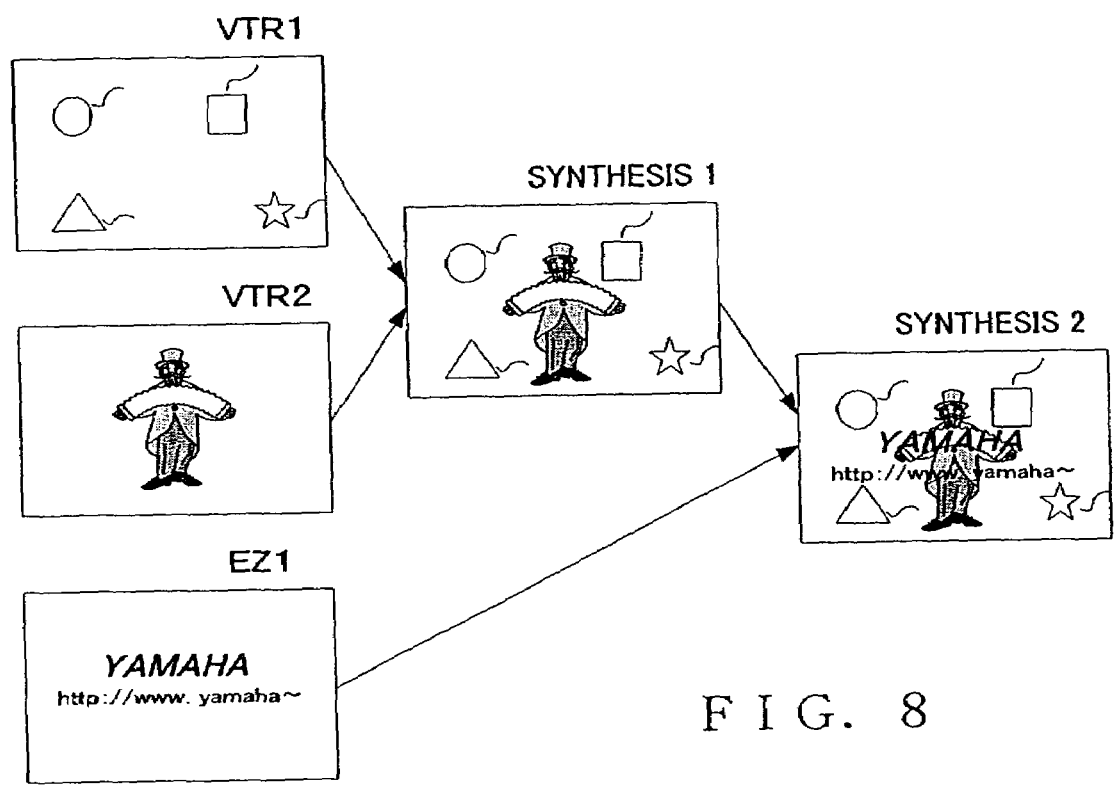
FIG. 8 is a diagram showing a specific example of picture synthesis that can be performed using the video mixer apparatus of the present invention.
Figures 9, 10:
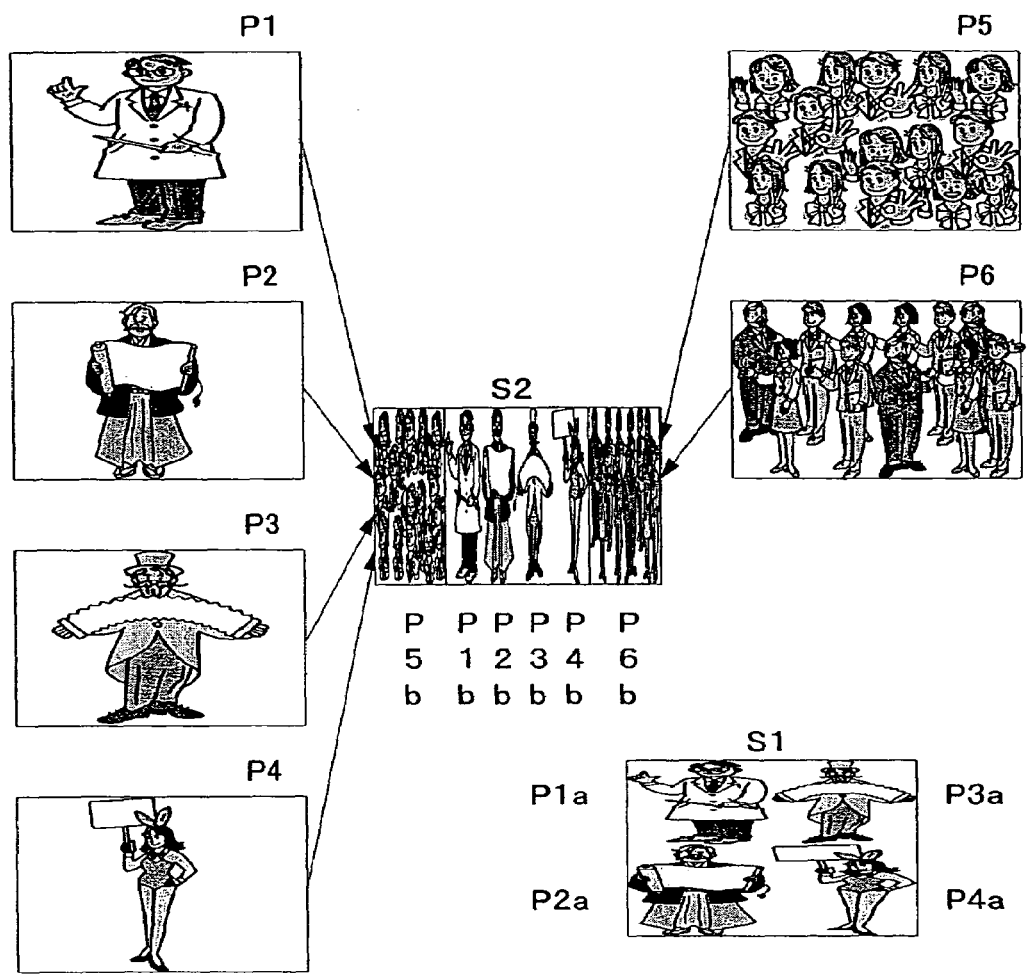
FIG. 9 is a diagram showing another specific example of the picture synthesis that can be performed using the video mixer apparatus of the present invention.
FIG. 10 is a conceptual diagram showing an example of a screen displayed for editing of TCrCb signals in an edit mode of the video mixer apparatus.

Therefore, the following paragraphs describe video picture synthesis that can be performed using the video mixer apparatus VM of the present invention, with reference to FIGS. 8 and 9. FIG. 8 is a diagram showing a specific example of the picture synthesis that can be performed using the video mixer apparatus VM of the present invention. In the illustrated example of FIG. 8, first and second video tape recorders are connected with the first and second channels CH1 and CH2 of the video mixer apparatus VM and a personal computer is connected with the third channel CH3 so that video pictures are input from the video tape recorders VTR1 and VTR2 and personal computer to the video mixer apparatus VM.

The first video tape recorder (not shown) reproduces, from a video tape installed therein, a background video picture with a plurality of various figures of colors and shapes (in the illustrated example, four figures of circular, triangular, rectangular and start-like shapes) moving randomly (VTR1). The second video tape recorder (also not shown) reproduces, from a video tape installed therein, a video picture of a 3-D CG character dancing (VTR2). Personal computer (also not shown) displays a text-only video picture indicating a title of an event and name of a DJ or VJ and home page URL or the like (EZ1) typed in by the human operator on the spot. For example, these video pictures VTR1, VTR2 and EZ1 are input to the video picture input terminals VIDEO IN1-VIDEO IN3 (namely, first to third channels), respectively, of the video mixer apparatus VM. For each of the input terminals VIDEO IN1-VIDEO IN3 (namely, first to third channels), the human operator adjusts the hue of the input video picture using the hue switch H, adjusts the luminance of the input video picture using the "Ygain" switch Y, and adjusts the color difference signals of the input video picture using the "Crgain" switch Cr and "Cbgain" switch Cb. Then, the human operator uses the gain sliders G corresponding to the input terminals VIDEO IN1 and VIDEO IN2 to adjust a ratio of video picture synthesis between the first and second channels. By so doing, the picture of the dancing 3-D CG character (VTR2) is incorporated into the background video picture of a plurality of the moving figures of various shapes and colors, and thus there can be created a synthesized video picture (synthesis 1) that looks as if the character were dancing in the background. Then, by synthesizing the thus-created video picture (synthesis 1) with the text-only video picture indicating the event title and name of the DJ or VJ typed in by the human operator on the personal computer and video picture indicating a home page URL or the like (EZ1) having been input via the third input terminals VIDEO IN3, there can be created a video picture (synthesis 2) having the typed-in text floating in front of the background (VTR1) and dancing 3-D CG character (VTR2).

By appropriately adjusting the hue, "Ygain", "Cbgain" and "Crgain" switches and gain sliders G corresponding to the input terminals VIDEO IN1-VIDEO IN3 as noted above, it is possible to create a new video picture in real time through synthesis of video pictures input via the three channels. In the thus-created video picture, the text can be more noticeable by the human operator moving downward the gain sliders G corresponding to the first and second channel or performing other operation. Thus, the human operator can readily create video pictures capable of enhancing a trip feel of the audience by performing such operation when the rhythm gets scarce due to music by the DJ or when the rhythm gets back to a normal state.

For example, in a case where the picture of the 3-D CG character and the picture of the typed-in text are difficult to see due to overlap therebetween, the human operator can make the textual video picture more outstanding by appropriately varying the synthesis ratio between the pictures. In such a case, it is possible to not only vary the synthesis ratio between the pictures by adjusting the hue, "Ygain", "Cbgain" and "Crgain" switches and gain sliders G corresponding to the second and third channels, but also promptly change the synthesis ratio using the ribbon controller Rc. More specifically, if the second channel is assigned as the ribbon-controller-operated upper channel Ru and the third channel is assigned as the ribbon-controller-operated lower channel Rl, the human operator can readily and promptly perform operation, such as for making the text more noticeable than the 3-D CG character or making the 3-D CG character more noticeable than the text, by changing the synthesis ratio as desired using the ribbon controller Rc. Further, a different video picture than that of the first channel is then input via the fourth channel that is not being used for picture entry, and the first channel is assigned as the ribbon-controller-operated upper channel Ru while the fourth channel is assigned as the ribbon-controller-operated lower channel Rl. Thus, a slow and progressive change in the background video picture can be made from the one of the first channel with the plurality of figures of various colors and shapes moving randomly to another one of the fourth channel as the human operator slowly moves his or her finger on and along the ribbon controller Rc from an upper end portion toward a lower end portion thereof. Further, by the human operator touching portions near the upper and lower ends of the ribbon controller Rc alternately with different fingers, an instantaneous shift can be made in the background video picture between the one of the first channel with the plurality of figures of various colors and shapes moving randomly to the other one of the fourth channel. In this way, the human operator can enjoy a tricky VJ play conforming to the music performance.

Further, when the video pictures of the first and second channels are both to be replaced other pictures, the gain sliders corresponding to the first and second channels are moved downward while the gain slider corresponding to the third channel is moved upward. Then, only the textual video picture of the third channel is displayed, during which time the video tapes in the first and second video tape recorders are replaced with other video tapes having recorded thereon video pictures to be newly input to the first and second channels, and then the other or newly-installed video tapes are reproduced. Then, the "solo/cue/preview" button SCP is depressed to select the cue function, and thus the video picture of the first or second channel currently at a preparatory stage can be ascertained on the monitor provided for the human operator. During that time, the human operator can adjust any desired one of the video pictures, using the hue, "Ygain", "Cbgain" and "Crgain" switches and gain sliders G corresponding to the corresponding first or second channel, in accordance with an ideal image of a video picture to be output.

FIG. 9 is a diagram showing another specific example of the picture synthesis that can be performed using the video mixer apparatus VM of the present invention. In the illustrated example of FIG. 9, six digital video cameras (hereinafter, first to eight cameras) are connected to the first to sixth channels, respectively, of the video mixer apparatus VM, so that video outputs from the first to sixth cameras are supplied to the video mixer apparatus VM. For example, close-up video pictures of first to sixth performers (P1-P6) are taken by the first to sixth cameras, respectively, while video pictures of the entire place of the music concert, such as those of the audience, (P5 and P6) are taken by the fifth and sixth cameras. Specifically, in the case of a music concert where a band performance is carried out on a stage, the first to sixth cameras may take different video pictures, for example, with the first camera shooting a vocalist, the second camera shooting a guitarist, the third camera shooting a bass guitarist, the fourth camera shooting a drummer, the fifth camera shooting a close-up of the audience and the sixth camera shooting an entire audience.

Then, a first scene S1 is created as follows.

As regards the first channel, a new video picture of the first performer P1 having a new size is created by reducing the horizontal dimension ("Hsize") of the input video picture (P1) by a factor of 2 (1/2 of the original horizontal dimension), reducing the vertical dimension ("Vsize") of the input video picture by a factor of 2, setting the horizontal position ("Hpos") of the input video picture to "0" and setting the vertical position ("Vpos") of the input video picture to "0", and the thus-created video picture P1a is placed in an upper left area of a displayed screen. As regards the second channel, a new video picture of the second performer P2 having a new size is created by reducing the horizontal dimension ("Hsize") of the input video picture (P2) by a factor of 2, reducing the vertical dimension ("Vsize") by a factor of 2, setting the horizontal position ("Hpos") to "0" and setting the vertical position ("Vpos") to "4", and the thus-created video picture P2a is placed in a lower left area of the displayed screen. As regards the third channel, a new video picture of the third performer P3 having a new size is created by reducing the horizontal dimension ("Hsize") of the input video picture (P3) by a factor of 2, reducing the vertical dimension ("Vsize") by a factor of 2, setting the horizontal position ("Hpos") to "4" and setting the vertical position ("Vpos") to "0", and the thus-created video picture P3a is placed in an upper right area of the displayed screen. Further, as regards the fourth channel, a new video picture of the fourth performer P4 having a new size is created by reducing the horizontal dimension ("Hsize") of the input video picture (P4) by a factor of 2, reducing the vertical dimension ("Vsize") by a factor of 2, setting the horizontal position ("Hpos") to "4" and setting the vertical position ("Vpos") to "4", and the thus-created video picture P4a is placed in a lower right area of the displayed screen.

After that, a second scene S2 is created as follows.

As regards the first channel, a new video picture of the first performer P1 having a vertically elongated shape is created by reducing the horizontal dimension ("Hsize") of the input video picture (P1) by a factor of 8 (1/8 of the original horizontal dimension), leaving the vertical dimension ("Vsize") unchanged from the original vertical dimension, setting the horizontal position ("Hpos") of the input video picture to "2" and setting the vertical position ("Vpos") of the input video picture to "0", and the thus-created video picture P1b is placed in a predetermined area of a displayed screen. As regards the second channel, a new video picture of the second performer P2 having a vertically elongated shape is created by reducing the horizontal dimension ("Hsize") of the input video picture (P2) by a factor of 8 (1/8 of the original horizontal dimension), leaving the vertical dimension ("Vsize") unchanged from the original vertical dimension, setting the horizontal position ("Hpos") to "3" and setting the vertical position ("Vpos") to "0", and the thus-created video picture P2b is placed in a predetermined area of the displayed screen. As regards the third channel, a new video picture of the third performer P3 having a vertically elongated shape is created by reducing the horizontal dimension ("Hsize") of the input video picture (P2) by a factor of 8, leaving the vertical dimension ("Vsize") unchanged from the original vertical dimension, setting the horizontal position ("Hpos") to "4" and setting the vertical position ("Vpos") to "0", and the thus-created video picture P3b is placed in a predetermined area of the displayed screen. Further, as regards the fourth channel, a new video picture of the fourth performer P4 having a vertically elongated shape is created by reducing the horizontal dimension ("Hsize") of the input video picture (P4) by a factor of 8, leaving the vertical dimension ("Vsize") unchanged from the original vertical dimension, setting the horizontal position ("Hpos") to "5" and setting the vertical position ("Vpos") to "0", and the thus-created video picture P4b is placed in a predetermined area of the displayed screen. As regards the fifth channel, a new close-up video picture of the audience P5 having a vertically elongated shape is created by reducing the horizontal dimension ("Hsize") of the input video picture (P5) by a factor of 4, leaving the vertical dimension ("Vsize") unchanged from the original vertical dimension, setting the horizontal position ("Hpos") to "0" and setting the vertical position ("Vpos") to "0", and the thus-created video picture P5b is placed in a predetermined area of the displayed screen. Further, as regards the sixth channel, a new video picture of the entire audience P6 having a vertically elongated shape is created by reducing the horizontal dimension ("Hsize") of the input video picture (P6) by a factor of 4, leaving the vertical dimension ("Vsize") unchanged from the original vertical dimension, setting the horizontal position ("Hpos") to "6" and setting the vertical position ("Vpos") to "0", and the thus-created video picture P6b is placed in a predetermined area of the displayed screen. Then, the human operator appropriately adjusts the luminance and hue of each of the video pictures by use of the hue, "Ygain", "Cbgain" and "Crgain" switches and gain slider G corresponding to the channel of the picture, while checking balance between the video pictures of the individual channels presented on the screen. After that, the human operator depresses the second scene button Sc2 while depressing the scene store button St so that the created scene S2 is stored in memory.

As described above, a shift can be made between the solo function and the cue function by depression of the "solo/cue/preview" button SCP. When any one of the channels is selected in the solo function mode, a video picture of the selected channel is sent out to the monitor line along with information representative of a position and size of the picture, the human operator can readily ascertain the designated position of the picture. Further, in the cue function mode, information representative eight screens is sent out to the monitor lines in divided form prior to a channel selection, and once any one of the channels is selected, a video picture of the selected channel is displayed on the entire screen. Further, in the edit mode, logical operations may be performed on the first to fourth channels, independently of each other, using values specific to the "Ygain", "Cbgain" and "Crgain", or settings may be made for replacing the "Cbgain" and "Crgain". Further, by varying the "Ygain", "Cbgain" and "Crgain" in realtime, it is possible to output the individual video pictures with different characteristics.

By storing a plurality of variations of screen arrangement patterns, such as those of the first scene S1 and second scene S2, created in the above-described manner, and then reading out a desired one of the video picture arrangement patterns using one of the scene buttons Sc1-Sc8, a prompt switch can be made between video picture screens having different video picture arrangement patterns. Namely, according to the instant embodiment of the present invention, settings (scenes) that allow individual input video pictures to be displayed in respective desired positions of an output screen with respective desired sizes can be stored as screen arrangement pattern data in an internal storage device of the video mixer apparatus VM or an external storage device, and any desired one of the scenes can be reproduced by reading out the corresponding screen arrangement pattern data through simple one-touch operation.

Finally, a specific description will be made about details of setting operations in the edit mode which can set details of parameters to be used for performing arithmetic or logical operations on the Y (luminance) signal and Cr and Cb (color difference) signals of the individual channels. Upon depression of the edit button E of FIG. 2, the video mixer apparatus VM is placed in the edit mode, and a screen is displayed to the human operator. FIG. 10 is a conceptual diagram showing an example of the screen displayed when the edit mode is selected by depression of the edit button E. Using the thus-displayed screen, the human operator can change the gain of any one of the Y, Cr and Cb signals that are determined on the basis of the respective tables stored for controlling the master channels and input channels CH1-CH8. In the illustrated example, "Y", "Cb" and "Cr" represents signal types in the YCrCb signals, "AND", "OR" and "XOR" represent logical operation expressions, and "00001111", "10110010" and "01101100" represent operating values used in the logical operation expressions.

The human operator designates a particular one of the logical operation expressions, operating values and other items that is to be changed, by using any of the arrow switches Aa-Ab (FIG. 2) to move the cursor; in the illustrated example of FIG. 10, the item to be changed is denoted by a hatched rectangular block. When one of the logical operation expressions is selected as an object to be changed, the "AND", "OR" or "XOR" can be switched to another logical operation expression separately for each type of signal. When one of operating values for use in the logical operation expressions is selected as an object to be changed, a numerical value represented by the bit row in question can be increased or decreased, for example, by use of the jog dial JD or by direct entry of a desired numerical value. Combination of the logical operation expression and operating value having been changed in this manner is stored in an operation table separately for each of the channels CH1-CH8. Thus, settings of the respective gains of the Y, Cr and Cb signals can be changed by performing special operations on the gain settings based on the special tables that are read out in accordance with operated amounts of the Y, Cr and Cb signals for each of the channels CH1-CH8. For example, irrespective of contents of the upper four bits (in the range of "0000"-"1111") of the Y signal in the special table read out in accordance with an operated amount of the "Ygain" switch, the upper four bits of the Y signal to be output always take "0000", and thus the luminance does not vary greatly even if the operated amount of the "Ygain" switch is increased. For example, if the constant to be used in the logical operation expression for the Y signal is "11111111", a value of the Y signal read out from the special table is used as it is. Namely, by thus allowing the human operator to freely change the gain variation of each of the signals, the human operator can manipulate the switches of the operator unit with increased flexibility or freedom, and the human operator is advantageously allowed to freely create a video picture fitting his, or her operational feeling or a special video picture unexpectable from his or her operational feeling.

It should be appreciated that the operational expressions to be used for determination of the gain may be arithmetic operational expressions, such as "ADD" (addition) and "SUB" (subtraction), other than the logical operational expressions.

Further, on the screen displayed when the edit mode is selected, an item "CrCb SWAP" is shown so that the human operator can set either "ON" or "OFF" for this item. Namely, the "CrCb SWAP" item is displayed for replacing the input Cr signal and input Cb signal with each other. That is, when the "CrCb SWAP" item is set to "ON", replacement between the input Cr signal and input Cb signal is executed. Namely, after the "CrCb SWAP" item is set to "ON", the Cr signal is treated as the Cb signal while the Cb signal is treated as the Cr signal, so that gain curves (special tables) of the Cr and Cb signals reflecting operated amounts of the corresponding switches are replaced with each other.

Whereas the embodiment of the video mixer apparatus VM has been described so far only in relation to video picture synthesis, the mixer apparatus VM may be arranged to process sound signals simultaneously with video picture signals.

Further, the screens, on which video pictures are projected, may have a special shape, such as a spherical shape, rather than being limited to a flat shape alone. Furthermore, it is not always necessary to employ dedicated screens, and video pictures may be projected onto a ceiling, wall or other object in place of or in addition to the screens.

Furthermore, whereas the embodiment of the invention has been described above as progressively varying the displayed position or size of a video picture in seven or eight steps, the video mixer apparatus may be modified to vary the displayed position or size in finer or coarser steps, or vary the displayed position or size continuously rather than stepwise.

Furthermore, whereas the embodiment of the invention has been described above as being capable of storing up to eight scenes, the video mixer apparatus may be modified to store nine or more scenes by combined use of a plurality of keys.

Moreover, whereas the video mixer apparatus of the invention has been described above in relation to the embodiment having groups of switches provided in corresponding to the channels CH1-CH8, there may be provided only one group of switches, and this single switch group may be shared among the channels CH1-CH8. Namely, the video mixer apparatus of the invention may be arranged to assign the single switch group to various setting operations only for video signals input via a selected one of the channels CH1-CH8.

It should also be appreciated that video picture signals input via a plurality of channels to the video mixer apparatus of the invention may be in digital form rather than in analog form. Further, the input video picture signals may be other than YCrCb signals, such as RGB signals, as long as the signals can represent the luminance and hue of video pictures. However, if compatibility with a black-and-white television is considered, the YCrCb signals, having the luminance signal and the color difference signals separated from each other, are more advantageous than the RGB signals for the following reasons. Namely, human eyes have the inherent characteristics that they can readily recognize a variation of luminance but can not readily recognize a fine variation of color. Thus, even a video picture based on signals obtained by compressing color difference signals (e.g., Cr and Cb signals) representative of a slight color variation is identified by the human eye to be just the same as a video picture based on non-compressed signals. Thus, compressing the color difference signals is advantageous in that it can save frequency bands necessary for transmitting and recording the video signals. Further, using the YCrCb signals is more advantageous than using the RGB signals in that it can simplify the luminance- and hue-gain determining operations performed in accordance with the special tables and operational tables for each of the channels.

In summary, the present invention affords the following benefits. The present invention is arranged such that a single video mixer apparatus can, by itself, create a video picture by mixing video picture signals input via three or more channels and perform control, such as effect impartment, independently on each input video picture signal. Further, because the present invention is arranged to promptly change a synthesis ratio between two desired channels selected from among three or more channels, it can promptly mix, at a desired synthesis ratio, video pictures input via three or more channels through simple operation.

The present invention relates to the subject matter of Japanese Patent Application No. 2001-054296 filed on Feb. 28, 2001, the disclosure of which is expressly incorporated herein by reference in its entirety.

What is claimed is:

1. A video mixer apparatus comprising:
   a video-picture-signal input section that receives video picture signals via at least three or more channels;
   at least three or more control instructing operators provided in corresponding relation to the at least three or more channels, each of said control instructing operators being operable to give a signal control instruction for a corresponding one of the channels in accordance with an operated amount of the control instructing operator;
   a control section that performs signal control on the video picture signals of individual ones of the channels on the basis of respective ones of the signal control instructions given by said control instructing operators; and
   a video-picture-signal synthesis section that synthesizes the video picture signals of the individual channels having been subjected to the signal control by said control section;
   a solo instruction section that instructs a solo of a desired channel; and
   a solo control section that normally outputs the video picture signals synthesized by said video-picture-signal synthesis section, wherein, when a solo has been instructed for any particular one of the channels, said solo control section outputs only the video picture signals of the particular channel for which the solo has been instructed.

2. A video mixer apparatus comprising:
   a video-picture-signal input section that receives video picture signals via at least three or more channels;
   at least three or more control instructing operators provided in corresponding relation to the at least three or more channels, each of said control instructing operators being operable to give a signal control instruction for a corresponding one of the channels in accordance with an operated amount of the control instructing operator;
   a control section that performs signal control on the video picture signals of individual ones of the channels on the basis of respective ones of the signal control instructions given by said control instructing operators;
   a video-picture-signal synthesis section that synthesizes the video picture signals of the individual channels having been subjected to the signal control by said control section;
   a cue instruction section that instructs a cue for a desired channel; and
   a cue control section that, when a cue has been instructed for any particular one of the channels, controls the video picture signals of the particular channel to be displayed in a fashion distinguished from the video picture signals of the other channels during display of the video picture signals synthesized by said video-picture signal synthesis section.

3. A video mixer apparatus as claimed in claim 2 which further comprises an output section that constantly outputs the video picture signals, synthesized by said video-picture-signal section, to a screen separate from a screen that displays the video picture signals of the particular channel under control of said cue control section.

4. A video mixer apparatus comprising:
   a video-picture-signal input section that receives video picture signals via at least three or more channels;
   at least three or more control instructing operators provided in corresponding relation to the at least three or more channels, each of said control instructing operators being operable to give a signal control instruction for a corresponding one of the channels in accordance with an operated amount of the control instructing operator;
   a control section that performs at least gain control on the video picture signals of individual ones of the channels on the basis of respective ones of the signal control instructions given by said control instructing operators;
   a video-picture-signal synthesis section that synthesizes the video picture signals of the individual channels having been subjected to the signal control by said control section;
   a preview instruction section that instructs a preview of a desired channel; and
   a preview control section that normally outputs the video picture signals synthesized by said video-picture-signal synthesis section, wherein, when a preview of any particular one of the channels has been instructed, said preview control section outputs only the video picture signals of the particular channel on condition that the gain of the particular channel in said control section is a predetermined gain.

5. A video mixer apparatus as claimed in claim 4 which further comprises an output section that constantly outputs the video picture signals, synthesized by said video-picture-signal synthesis section, to a screen separate from a screen that displays the video picture signals under control of said preview control section.

6. A video mixer apparatus comprising:
- a video-picture-signal input section that receives video picture signals via at least three or more channels;
- at least three or more control instructing operators provided in corresponding relation to the at least three or more channels, each of said control instructing operators being operable to give a signal control instruction for a corresponding one of the channels in accordance with an operated amount of the control instructing operator;
- a storage section that stores signal control information for each of the channels;
- a change section that changes the signal control information stored in said storage section in response to operation of any of said control instructing operators;
- a control section that performs signal control on the video picture signals of individual ones of the channels on the basis of the signal control information of the individual channels stored in said storage section;
- a video-picture-signal synthesis section that synthesizes the video picture signals of the individual channels having been subjected to the signal control by said control section;
- a scene memory that, in accordance with a scene storage instruction, stores, as one scene, the signal control information of the individual channels stored in said storage section; and
- a scene call section that, in accordance with a scene call instruction, calls the signal control information of the one scene from said scene memory and stores the called signal control information into said storage section.

7. A video mixer apparatus comprising:
- a video-picture-signal input section that receives video picture signals via at least three or more channels;
- at least three or more control instructing operators provided in corresponding relation to the at least three or more channels, each of said control instructing operators being operable to give a signal control instruction for a corresponding one of the channels in accordance with an operated amount of the control instructing operator, wherein said operators are arranged in a plurality of vertical rows corresponding to the channels and horizontally separated from each other, each of the vertical rows, corresponding to a different one of the channels, including a plurality of vertically-arranged operators corresponding to a plurality of parameters;
- a control section that performs signal control on the video picture signals of individual ones of the channels on the basis of respective ones of the signal control instructions given by said control instructing operators; and
- a video-picture-signal synthesis section that synthesizes the video picture signals of the individual channels having been subjected to the signal control by said control section.

8. A video mixer apparatus as claimed in claim 7 wherein a size-controlling operator is among the operators provided for each of the channels.

9. A video mixer apparatus as claimed in claim 7 wherein a position-controlling operator is among the operators provided for each of the channels.

10. A video mixer apparatus as claimed in claim 7 wherein a hue-controlling operator is among the operators provided for each of the channels.

11. A video mixer apparatus as claimed in claim 7 wherein a Y-signal-controlling operator is among the operators provided for each of the channels.

12. A video mixer apparatus as claimed in claim 7 wherein a Cb-signal-controlling operator is among the operators provided for each of the channels.

13. A video mixer apparatus as claimed in claim 7 wherein a Cr-signal-controlling operator is among the operators provided for each of the channels.

14. A video mixer apparatus as claimed in claim 7 wherein a channel-selecting operator is among the operators provided for each of the channels.

15. A video mixer apparatus as claimed in claim 14 which further comprises a synthesis ratio adjusting operator sharable among all of the channels, and wherein a synthesis ratio between signals of two desired channels selected via the channel-selecting operators is adjustable via said synthesis ration adjusting operator.

16. A video mixer apparatus as claimed in claim 7 wherein a gain-controlling operator is among the operators provided for each of the channels.

* * * * *